US011082228B2

(12) United States Patent
Takemori et al.

(10) Patent No.: US 11,082,228 B2
(45) Date of Patent: Aug. 3, 2021

(54) REUSE SYSTEM, KEY GENERATION DEVICE, DATA SECURITY DEVICE, IN-VEHICLE COMPUTER, REUSE METHOD, AND COMPUTER PROGRAM

(71) Applicant: KDDI CORPORATION, Tokyo (JP)

(72) Inventors: Keisuke Takemori, Tokyo (JP);
Seiichiro Mizoguchi, Tokyo (JP);
Hideaki Kawabata, Tokyo (JP);
Ayumu Kubota, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 378 days.

(21) Appl. No.: 16/315,891

(22) PCT Filed: Jul. 26, 2017

(86) PCT No.: PCT/JP2017/027036
§ 371 (c)(1),
(2) Date: Jan. 7, 2019

(87) PCT Pub. No.: WO2018/087963
PCT Pub. Date: May 17, 2018

(65) Prior Publication Data
US 2019/0245691 A1    Aug. 8, 2019

(30) Foreign Application Priority Data

Nov. 10, 2016    (JP) .............................. JP2016-219709

(51) Int. Cl.
*H04L 9/32*     (2006.01)
*H04L 9/14*     (2006.01)
(Continued)

(52) U.S. Cl.
CPC .......... *H04L 9/3234* (2013.01); *B60R 16/023* (2013.01); *G06F 21/44* (2013.01);
(Continued)

(58) Field of Classification Search
CPC ....... H04L 9/3234; H04L 9/08; H04L 9/0838; H04L 9/14; H04L 9/32; H04L 2209/84;
(Continued)

(56) References Cited

U.S. PATENT DOCUMENTS 6,360,161 B1 * 3/2002 Francis ............... F02D 41/2422
123/486
8,275,130 B2 * 9/2012 Kawamura ........... H04W 12/06
380/44
(Continued)

FOREIGN PATENT DOCUMENTS

CN    105989477 A    10/2016
JP    06-171477 A    6/1994
(Continued)

OTHER PUBLICATIONS

Search Report issued in European Patent Office (EPO) Patent Application No. 17868999.8, dated May 25, 2020.
(Continued)

*Primary Examiner* — Shahriar Zarrineh
(74) *Attorney, Agent, or Firm* — Greenblum & Bernstein, P.L.C.

(57)    ABSTRACT

A reuse system includes: a key generation device; an in-vehicle computer that is detached from a first vehicle and is installed in a second vehicle; and a data security device that is installed in the second vehicle. The key generation device includes a vehicle interface, and a key generation unit that generates a first key that is the same as a key stored in the in-vehicle computer from a time when being installed in the first vehicle by using an in-vehicle computer identifier, and a master key that is common to the first and second vehicles, and transmits the first key to the second vehicle. The data security device includes a first interface unit, and a first cryptographic processing unit that encrypts first data, which is applied to the in-vehicle computer, with the first key to
(Continued)

generate encrypted first data, and transmits the encrypted first data to the in-vehicle computer.

3 Claims, 9 Drawing Sheets

(51) Int. Cl.
*G06F 21/57* (2013.01)
*H04L 9/08* (2006.01)
*G06F 21/44* (2013.01)
*B60R 16/023* (2006.01)

(52) U.S. Cl.
CPC .......... *G06F 21/57* (2013.01); *G06F 21/575* (2013.01); *H04L 9/08* (2013.01); *H04L 9/0838* (2013.01); *H04L 9/14* (2013.01); *H04L 9/32* (2013.01); *H04L 9/3242* (2013.01); *H04L 2209/84* (2013.01)

(58) Field of Classification Search
CPC ....... B60R 16/023; G06F 21/44; G06F 21/57; G06F 21/575
See application file for complete search history.

(56) References Cited

U.S. PATENT DOCUMENTS

| | | | |
|---|---|---|---|
| 9,960,915 B2* | 5/2018 | Ahn | H04L 9/3273 |
| 2002/0148090 A1 | 10/2002 | Kaburagi et al. | |
| 2004/0003227 A1* | 1/2004 | Reinold | H04L 9/3271 713/155 |
| 2004/0003249 A1* | 1/2004 | Dabbish | H04L 63/126 713/170 |
| 2006/0115085 A1* | 6/2006 | Iwamura | H04L 9/0822 380/259 |
| 2007/0081473 A1* | 4/2007 | Jiang | H04L 12/40169 370/254 |
| 2007/0113070 A1* | 5/2007 | Lackritz | H04L 9/30 713/151 |
| 2007/0225873 A1* | 9/2007 | Toya | H04L 12/66 701/1 |
| 2011/0109447 A1 | 5/2011 | Sawaguchi | |
| 2012/0321077 A1* | 12/2012 | Shiota | H04L 9/304 380/44 |
| 2013/0169234 A1* | 7/2013 | Chuah | H01M 10/486 320/136 |
| 2013/0230173 A1* | 9/2013 | Hori | H04L 9/0891 380/281 |
| 2014/0114497 A1 | 4/2014 | Miyake | |
| 2014/0143839 A1* | 5/2014 | Ricci | H04N 21/25816 726/4 |
| 2014/0359292 A1* | 12/2014 | Kawamura | H04L 9/0822 713/168 |
| 2014/0359296 A1* | 12/2014 | Alrabady | G06F 12/1408 713/176 |
| 2015/0010145 A1* | 1/2015 | Iwashita | H04L 9/3271 380/44 |
| 2015/0033019 A1* | 1/2015 | Oguma | H04L 9/0822 713/171 |
| 2015/0052352 A1* | 2/2015 | Dolev | H04L 9/3215 713/156 |
| 2016/0098555 A1* | 4/2016 | Mersh | G06F 21/51 713/187 |
| 2016/0173505 A1 | 6/2016 | Ichihara | |
| 2016/0315766 A1* | 10/2016 | Ujiie | H04L 9/083 |
| 2016/0371481 A1* | 12/2016 | Miyake | H04L 63/0846 |
| 2016/0379424 A1* | 12/2016 | Krishnan | G07C 9/00896 340/5.61 |
| 2017/0026373 A1* | 1/2017 | Yajima | H04L 63/0884 |
| 2017/0111177 A1* | 4/2017 | Oguma | H04L 67/12 |
| 2017/0111178 A1* | 4/2017 | Winkelvos | H04W 12/0431 |
| 2017/0139795 A1* | 5/2017 | Komano | H04L 63/08 |
| 2017/0324558 A1 | 11/2017 | Takemori et al. | |
| 2018/0025556 A1* | 1/2018 | Madhavan | G06F 21/121 710/107 |
| 2018/0068107 A1* | 3/2018 | Takemori | H04L 9/08 |
| 2018/0084412 A1* | 3/2018 | Alfred | H04W 12/041 |
| 2018/0227120 A1* | 8/2018 | Takemori | H04L 9/0894 |
| 2019/0007215 A1* | 1/2019 | Hakuta | H04L 9/3247 |
| 2019/0245691 A1* | 8/2019 | Takemori | H04L 9/08 |
| 2020/0348924 A1* | 11/2020 | Park | H04L 9/0891 |

FOREIGN PATENT DOCUMENTS

| | | |
|---|---|---|
| JP | 2001-195587 A | 7/2001 |
| JP | 2002-73900 A | 3/2002 |
| JP | 2010-011400 A | 1/2010 |
| JP | 2016-116216 A | 6/2016 |

OTHER PUBLICATIONS

Keisuke Takemori et al., "In-Vehicle Network Security Using Secure Elements—Discussion of Security Technologies—", IEICE, IEICE Technical Report, vol. 114, No. 508, Mar. 2015, pp. 73-78.
Japanese Industrial Standards, 82nd Edition, JIS D4901, Vechicle Identification Number (VIN), with English language translation, Oct. 15, 1982.
STMicroelectronics, AN4240 Application Note, "Introduction to the Cryptographic Service Engine (CSE) module for SPC56ECxx and SPC564Bxx devices" Internet URL: http://www.st.com/web/en/technical/document/application_note/DM00075575.pdf, Sep. 2013.
Keisuke Takemori et al., "Key Managements for ECU and Code Authentications Using Tamper-resistant Secure Elements," IEICE Technical Report, vol. 115, No. 364, Dec. 10, 2015, pp. 227-232.
Hideaki Kawabata et al., "A Key Management Framework for Automotive ECUs", 2016 Symposium on Cryptography an Information Security, Jan. 19, 2016, pp. 1-7.
International Search Report issued in International Patent Application No. PCT/JP2017/027036, dated Oct. 10, 2017.
U.S. Appl. No. 16/307,681 to Keisuke Takemori et al., which was filed Dec. 6, 2018.
Office Action issued in Chinese Counterpart Patent Appl. No. 201780042605.9, dated Feb. 2, 2021, along with an English translation thereof.

* cited by examiner

US 11,082,228 B2

REUSE SYSTEM, KEY GENERATION DEVICE, DATA SECURITY DEVICE, IN-VEHICLE COMPUTER, REUSE METHOD, AND COMPUTER PROGRAM

TECHNICAL FIELD

The present invention relates to a reuse system, a key generation device, a data security device, an in-vehicle computer, a reuse method, and a computer program.

Priority is claimed on Japanese Patent Application No. 2016-219709, filed Nov. 10, 2016, the content of which is incorporated herein by reference.

BACKGROUND ART

Conventionally, automobiles have an electronic control unit (ECU), and implements a function such as engine control through the ECU. The ECU is a type of computer and implements a desired function through a computer program. For example, security technology for an in-vehicle control system configured by connecting a plurality of ECUs to a controller area network (CAN) is described in Non-Patent Document 1.

CITATION LIST

Patent Literature

[Non-Patent Literature 1]
Keisuke TAKEMORI, "In-vehicle Network Security Using Secure Elements: Discussion of Security Technologies", Institute of Electronics, Information and Communication Engineers, Technical Report, vol. 114, no. 508, pp. 73-78, March 2015
[Non-Patent Literature 2]
Japanese Industrial Standard, JIS D4901, "Vehicle Identification Number (VIN)"
[Non-Patent Literature 3]
STMicroelectronics, "AN4240 Application note", retrieved on Oct. 5, 2016, Internet <URL:http/www.st.com/web/en/resource/technical/document/application_note/DM00075575.pdf>

SUMMARY OF INVENTION

Problem to be Solved by the Invention

In a case of reusing a used ECU installed in any automobile in another vehicle, it is necessary to improve reliability of the automobile on which the used ECU is installed.

The invention has been made in consideration of such circumstances, and an object thereof is to provide a reuse system, a key generation device, a data security device, an in-vehicle computer, a reuse method, and a computer program which are capable of improving the reliability of an automobile on which a used article such as an ECU is installed.

Means for Solving the Problem (1) According to an aspect of the invention, a reuse system is provided, including: a key generation device; an in-vehicle computer that is detached from a first vehicle and is installed in a second vehicle; and a data security device that is installed in the second vehicle. The key generation device includes, a vehicle interface configured to transmit and receive data to and from the second vehicle, and a key generation unit configured to generate a first key that is the same as a key stored in the in-vehicle computer from a time when the in-vehicle computer was installed in the first vehicle by using an in-vehicle computer identifier of the in-vehicle computer, and a master key that is common to the first vehicle and the second vehicle, wherein the first key is transmitted to the second vehicle with the vehicle interface. The data security device includes, a first interface unit configured to transmit and receive data to and from an external device of the data security device, and a first cryptographic processing unit configured to encrypt first data, which is applied to the in-vehicle computer, with the first key received from the key generation device through the first interface unit to generate encrypted first data, wherein the encrypted first data is transmitted to the in-vehicle computer through the first interface unit. The in-vehicle computer includes, a second interface unit configured to transmit and receive data to and from an external device of the in-vehicle computer, a second storage unit configured to store the first key from a time when the in-vehicle computer was installed in the first vehicle, and a second cryptographic processing unit configured to decrypt the encrypted first data, which is received from the data security device through the second interface unit, with the first key that is stored in the second storage unit.

(2) According to another aspect of the invention, in the reuse system according to (1), the in-vehicle computer further stores a second key in the second storage unit, and further includes a measurement unit configured to perform measurement of data that is applied to the in-vehicle computer by using the second key that is stored in the second storage unit, the key generation unit further generates the second key that is the same as a key stored in the in-vehicle computer by using the in-vehicle computer identifier and the master key, and the key generation device further includes an expected value calculation unit configured to calculate an expected value of the measurement by using the second key generated by the key generation unit.

(3) According to still another aspect of the invention, in the reuse system according to (2), the key generation device may further include a verification unit configured to verify verifies a measurement result of the measurement unit, which is received from the second vehicle through the vehicle interface, with the expected value.

(4) According to still another aspect of the invention, in the reuse system according to (2), the data security device may further includes a verification unit configured to verify a measurement result of the measurement unit, which is received from the in-vehicle computer through the first interface unit, with the expected value.

(5) According to still another aspect of the invention, a reuse system is provided, including: a key generation device; and a data security device that is detached from a first vehicle and is installed in a second vehicle. The key generation device includes a vehicle interface configured to transmit and receive data to and from the second vehicle, a key generation unit configured to generate a third key that is the same as a key that is stored in the data security device from a time when the data security device was installed in the first vehicle by using a device identifier of the data security device and a master key that is common to the first vehicle and the second vehicle, and an cryptographic processing unit configured to encrypt a fourth key of an in-vehicle computer that is installed in the second vehicle with the third key to generate an encrypted fourth key, wherein the encrypted fourth key is transmitted to the second vehicle through the vehicle interface. The data security device includes a first interface unit configured to transmit and receive data to and from an external device of the data security device, a first storage unit configured to store the third key from a time when the data security device was installed in the first vehicle, and a first cryptographic processing unit configured to decrypt the encrypted fourth key, which is received from the key generation device through the first interface unit, with the third key that is stored in the first storage unit.

(6) According to still another aspect of the invention, in the reuse system according to (5), the first cryptographic processing unit may encrypt first data, which is applied to the in-vehicle computer, with the fourth key acquired by decryption of the encrypted fourth key to generate encrypted first date, and the data security device may transmit the encrypted first data to the in-vehicle computer through the first interface unit.

(7) According to still another aspect of the invention, a key generation device is provided, including: a vehicle interface configured to transmit and receive data to and from a second vehicle in which an in-vehicle computer detached from a first vehicle is installed; and a key generation unit configured to generate a first key that is the same as a key stored in the in-vehicle computer from a time when the in-vehicle computer was installed in the first vehicle by using an in-vehicle computer identifier of the in-vehicle computer, and a master key that is common to the first vehicle and the second vehicle, wherein the first key is transmitted to the second vehicle though the vehicle interface.

(8) According to still another aspect of the invention, a data security device is provided that is installed in a second vehicle on which an in-vehicle computer detached from a first vehicle is installed. The data security device includes: a first interface unit configure to transmit and receive data to and from an external device of the data security device; and a first cryptographic processing unit configure to encrypt first data, which is applied to the in-vehicle computer, with a first key received from a key generation device through the first interface unit to generate encrypted first data, wherein the encrypted first data is transmitted to the in-vehicle computer through the first interface unit.

(9) According to still another aspect of the invention, an in-vehicle computer is provided that is detached from a first vehicle and is installed in a second vehicle. The in-vehicle computer includes: a second interface unit configured to transmit and receive data to and from an external device of the in-vehicle computer; a second storage unit configured to store a first key from a time when being installed in the first vehicle; and a second cryptographic processing unit configured to decrypt encrypted first data, which is received from a data security device through the second interface unit, with the first key that is stored in the second storage unit.

(10) According to still another aspect of the invention, a key generation device is provided, including: a vehicle interface configured to transmit and receive data to and from a second vehicle in which a data security device detached from a first vehicle is installed; a key generation unit configured to generate a third key that is the same as a key stored in the data security device from a time when the data security device was installed in the first vehicle by using a device identifier of the data security device, and a master key that is common to the first vehicle and the second vehicle; and a cryptographic processing unit configured to encrypt a fourth key of an in-vehicle computer that is installed in the second vehicle with the third key to generate an encrypted fourth key, wherein the encrypted fourth key is transmitted to the second vehicle with the vehicle interface.

(11) According to still another aspect of the invention, a data security device is provided that is detached from a first vehicle and is installed in a second vehicle. The data security device includes: a first interface unit configured to transmit and receive data to and from an external device of the data security device; a first storage unit configured to store a third key from a time when being installed in the first vehicle; and a first cryptographic processing unit configured to decrypt encrypted fourth key, which is received from the key generation device through the first interface unit, with the third key that is stored in the first storage unit.

(12) According to still another aspect of the invention, a reuse method of an in-vehicle computer is provided that is detached from a first vehicle and is installed in a second vehicle. The reuse method includes generating, by a key generation device, a first key that is the same as a key stored in the in-vehicle computer from a time when the in-vehicle computer was installed in the first vehicle by using an in-vehicle computer identifier of the in-vehicle computer and a master key that is common to the first vehicle and the second vehicle; transmitting, by the key generation device, the first key to the second vehicle through a vehicle interface that transmits and receives data to and from the second vehicle; encrypting, by a data security device, first data, which is applied to the in-vehicle computer, with the first key received from the key generation device through a first interface unit that transmits and receives data to and from an external device of the data security device to generate encrypted first data; transmitting, by the data security device, the encrypted first data to the in-vehicle computer through the first interface unit; and encrypting, by the in-vehicle computer, the encrypted first data, which is received from the data security device through a second interface unit that transmits and receives data to and from an external device of the in-vehicle computer, with the first key stored in a second storage unit of the in-vehicle computer from a time when the in-vehicle computer was installed in the first vehicle.

(13) According to still another aspect of the invention, a reuse method of a data security device is provided that is detached from a first vehicle and is installed in a second vehicle. The reuse method includes generating, by a key generation device, a third key that is the same as a key that is stored in the data security device from a time when the data security device was installed in the first vehicle by using a device identifier of the data security device and a master key that is common to the first vehicle and the second vehicle; encrypting, by the key generation device, a fourth key of an in-vehicle computer that is installed in the second vehicle with the third key to generate an encrypted fourth key; transmitting, by the key generation device, the encrypted fourth key to the second vehicle though a vehicle interface that transmits and receives data to and from the second vehicle; and decrypting, by the data security device, the encrypted fourth key, which is received from the key generation device through a first interface unit that transmits and receives data to and from an external device of the data security device, with the third key that is stored in a first storage unit of the data security device from a time when being installed in the first vehicle.

(14) According to still another aspect of the invention, a computer program is provided that causes a computer of a key generation device, which includes a vehicle interface that transmits and receives data to and from a second vehicle on which an in-vehicle computer detached from a first vehicle is installed, to realize processing of: generating a first key that is the same as a key stored in the in-vehicle computer from a time when the in-vehicle computer was installed in the first vehicle by using an in-vehicle computer identifier of the in-vehicle computer, and a master key that is common to the first vehicle and the second vehicle; and transmitting the first key to the second vehicle through the vehicle interface.

(15) According to still another aspect of the invention, a computer program is provided that causes a computer of a data security device, which is installed in a second vehicle in which an in-vehicle computer detached from a first vehicle is installed, to realize processing of: encrypting first data, which is applied to the in-vehicle computer, with a first key received from a key generation device through a first interface unit that transmits and receives data to and from an external device of the data security device to generate encrypted first data; and transmitting the encrypted first data to the in-vehicle computer through the first interface unit.

(16) According to still another aspect of the invention, a computer program is provided that causes an in-vehicle computer, which is detached from a first vehicle and is installed in a second vehicle, to realize processing of: decryption encrypted first data, which is received from a data security device through a second interface unit that transmits and receives data to and from an external device of the in-vehicle computer, with a first key stored in a second storage unit of the in-vehicle computer from a time when being installed in the first vehicle.

(17) According to still another aspect of the invention, a computer program is provided that causes a computer of a key generation device, which includes a vehicle interface that transmits and receives data to and from a second vehicle on which a data security device detached from a first vehicle is installed, to realize processing of: generating a third key that is the same as a key that is stored in the data security device from a time when the data security device was installed in the first vehicle by using a device identifier of the data security device and a master key that is common to the first vehicle and the second vehicle; encrypting a fourth key of an in-vehicle computer that is installed in the second vehicle with the third key to generate an encrypted fourth key; and transmitting the encrypted fourth key to the second vehicle through the vehicle interface.

(18) According to still another aspect of the invention, a computer program is provided that causes a computer of a data security device, which is detached from a first vehicle and is installed in a second vehicle, to realize processing of: decryption encrypted fourth key, which is received from a key generation device through a first interface unit that transmits and receives data to and from an external device of the data security device, with a third key that is stored in a first storage unit of the data security device from a time when being installed in the first vehicle.

Advantageous Effects of Invention

According to the invention, it is possible to attain an effect that is capable of improving the reliability of an automobile on which a used ECU is installed.

DESCRIPTION OF EMBODIMENTS

Hereinafter, an embodiment of the invention will be described with reference to the accompanying drawings. Also, in the following embodiment, an automobile will be exemplified as a vehicle.

Figure 1:
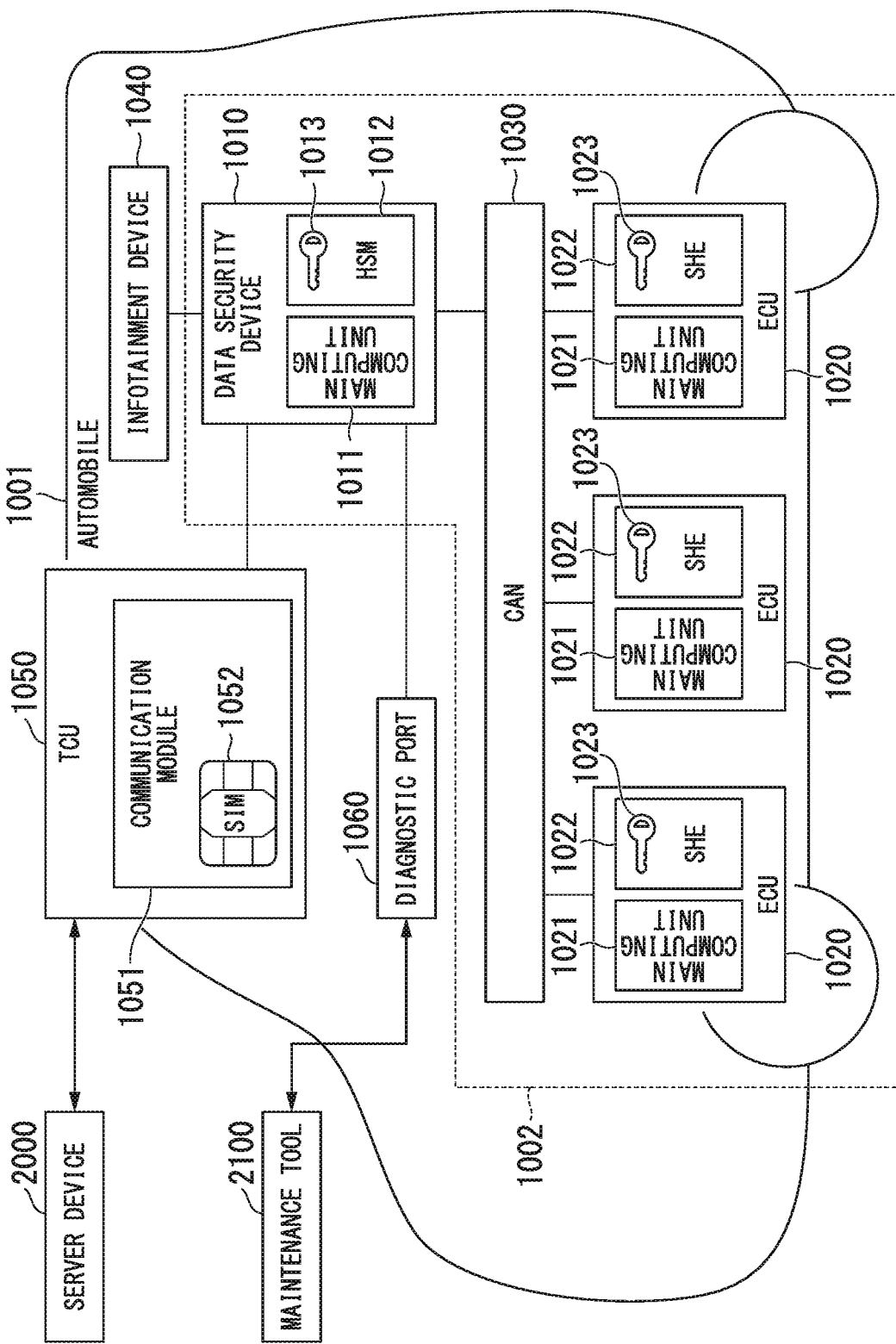
FIG. 1 is a view illustrating a configuration example of a reuse system and an automobile 1001 according to an embodiment.

FIG. 1 is a view illustrating a configuration example of a reuse system and an automobile 1001 according to an embodiment. In this embodiment, as an example of an in-vehicle computer, an electronic control device (ECU) that is installed in the automobile 1001 will be exemplified.

In FIG. 1, an automobile 1001 includes a data security device 1010 and a plurality of the ECUs 1020. The ECUs 1020 are in-vehicle computers which are provided in the automobile 1001. The ECUs 1020 have control functions such as engine control of the automobile 1001, and the like. Examples of the ECUs 1020 include an ECU having an engine control function, an ECU having a handle control function, an ECU having a brake control function, and the like. The data security device 1010 has a data security function that is applied to the ECUs 1020 installed in the automobile 1001.

Also, any ECU that is installed in the automobile 1001 may be allowed to function as the data security device 1010.

The data security device 1010 and the plurality of ECUs 1020 are connected to a controller area network (CAN) 1030 that is provided in the automobile 1001. The CAN 1030 is a communication network. The CAN is known as one of communication networks installed in vehicles. The data security device 1010 exchanges data with each ECU 1020 via the CAN 1030. Each of the ECUs 1020 exchanges data with another ECU 1020 via the CAN 1030.

Also, as the communication network installed in the vehicle, a communication network other than the CAN may be provided in the automobile 1001, and data exchange between the data security device 1010 and the ECUs 1020, and data exchange between the ECUs 1020 may be performed via the communication network other than the CAN. For example, a local interconnect network (LIN) may be provided in the automobile 1001. In addition, the CAN and the LIN may be provided in the automobile 1001. In addition, the automobile 1001 may include the ECUs 1020 which are connected to the LIN. In addition, the data security device 1010 may be connected to the CAN and the LIN. In addition, the data security device 1010 may exchange data with the ECUs 1020 which are connected to the CAN via the CAN, or may exchange data with the ECUs 1020 which are connected to the LIN via the LIN. In addition, the ECUs 1020 may exchange data with each other via the LIN.

An in-vehicle computer system 1002 that is provided in the automobile 1001 has a configuration in which the data security device 1010 and the plurality of ECUs 1020 are connected to the CAN 1030. In this embodiment, the in-vehicle computer system 1002 function as an in-vehicle control system of the automobile 1001.

The data security device 1010 monitors communication between an inner side and an outer side of the in-vehicle computer system 1002. The data security device 1010 is connected to an infotainment device 1040, a tele communication unit (TCU) 1050, and a diagnostic port 1060 as an example of an external device of the in-vehicle computer system 1002. Each of the ECUs 1020 performs communication with devices outside the in-vehicle computer system 1002 via the data security device 1010.

Also, with regard to a configuration of the CAN 1030, the CAN 1030 may include a plurality of buses (communication lines), and the plurality of buses may be connected to the data security device 1010. In this case, one ECU 1020 or a plurality of the ECUs 1020 are connected to one of the buses.

The automobile 1001 includes the diagnostic port 1060. As the diagnostic port 1060, for example, an on-board diagnostics (OBD) port may be used. A device outside the automobile 1001 can be connected to the diagnostic port 1060. Examples of the external device of the automobile 1001, which can be connected to the diagnostic port 1060, include a maintenance tool 2100 illustrated in FIG. 1, and the like. The data security device 1010 and a device that is connected to the diagnostic port 1060, for example, the maintenance tool 2100 exchange data via the diagnostic port 1060. The maintenance tool 2100 may have a function of a diagnostic terminal that is connected to the OBD port in the related art.

The automobile 1001 includes the infotainment device 1040. Examples of the infotainment device 1040 include devices having a navigation function, a position information service function, a function of reproducing multimedia such as music and a moving image, a voice communication function, a data communication function, an Internet connection function, and the like.

The automobile 1001 includes the TCU 1050. The TCU 1050 is a communication device. The TCU 1050 includes a communication module 1051. The communication module 1051 performs radio communication by using a radio communication network. The communication module 1051 includes a subscriber identity module (SIM) 1052. The SIM 1052 is an SIM on which information for using the radio communication network is recorded. The communication module 1051 can be connected to the radio communication network by using the SIM 1052 to perform radio communication.

Furthermore, as the SIM 1052, an embedded subscriber identity module (eSIM) may be used.

The data security device 1010 exchanges data with the TCU 1050. Also, as another connection type of the TCU 1050, for example, the TCU 1050 may be connected to the infotainment device 1040, and the data security device 1010 may exchange data with the TCU 1050 via the infotainment device 1040. Alternatively, the TCU 1050 may be connected to the diagnostic port 1060, and the data security device 1010 may exchange data with the TCU 1050 connected to the diagnostic port 1060 via the diagnostic port 1060.

Alternatively, the data security device 1010 may include the communication module 1051 including the SIM 1052. In a case where the data security device 1010 includes the communication module 1051 including the SIM 1052, the automobile 1001 may not include the TCU 1050.

The data security device 1010 includes a main computing unit 1011 and a hardware security module (HSM) 1012. The main computing unit 1011 executes a computer program to realize a function of the data security device 1010. The HSM 1012 has a cryptographic processing function and the like. The HSM 1012 is tamper resistance. The HSM 1012 is an example of a secure element (SE). The HSM 1012 includes a storage unit 1013 configured to store data. The main computing unit 1011 uses the HSM 1012.

The ECU 1020 includes a main computing unit 1021 and a secure hardware extension (SHE) 1022. The main computing unit 1021 executes a computer program to realize a function of the ECU 1020. The SHE 1022 has a cryptographic processing function, and the like. The SHE 1022 is tamper resistance. The SHE 1022 is an example of the secure element. The SHE 1022 includes a storage unit 1023 configured to store data. The main computing unit 1021 uses the SHE 1022.

The server device 2000 transmits and receives data to and from the communication module 1051 of the TCU 1050 of the automobile 1001 via a communication line. The server device 2000 transmits and receives data to and from the communication module 1051 via a radio communication network that is used by the communication module 1051 of the TCU 1050 of the automobile 1001. Alternatively, the server device 2000 may transmit and receive data to and from the communication module 1051 via a communication network such as the Internet, and the radio communication network. Alternatively, for example, the server device 2000 and the communication module 1051 may be connected via a dedicated line such as a virtual private network (VPN) line, and data may be transmitted and received via the dedicated line. For example, a dedicated line such as the VPN line may be provided by a radio communication network corresponding to the SIM 1052. Alternatively, the server device 2000 and the automobile 1001 may be connected to each other via a communication table. For example, the server device 2000 and the data security device 1010 of the automobile 1001 may be configured to be connected to each other via the communication cable.

The server device 2000 has a key generation function and the like. The server device 2000 executes processing related to reuse of a used ECU. In this embodiment, the server device 2000 is an example of a key generation device.

Figure 2:
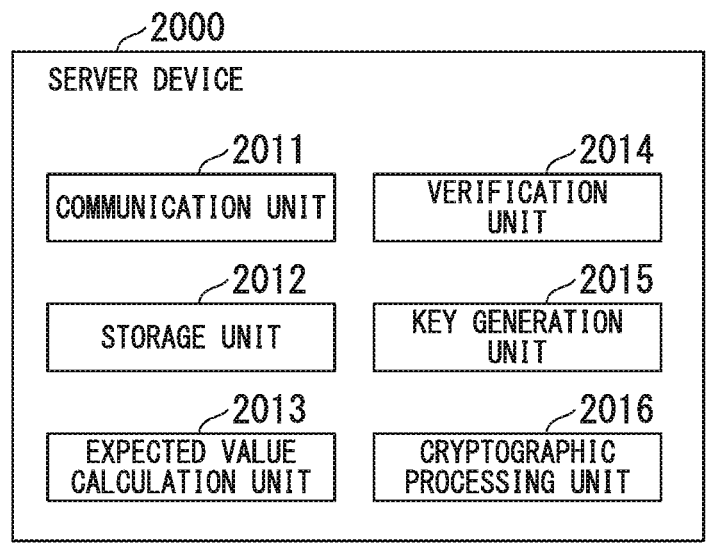
FIG. 2 is a view illustrating a configuration example of a server device 2000 according to this embodiment.

FIG. 2 is a view illustrating a configuration example of the server device 2000. In FIG. 2, the server device 2000 includes a communication unit 2011, a storage unit 2012, an expected value calculation unit 2013, a verification unit 2014, a key generation unit 2015, and a cryptographic processing unit 2016. The communication unit 2011 performs communication with another device via a communication line. The communication unit 2011 corresponds to a vehicle interface. The storage unit 2012 stores data.

The expected value calculation unit 2013 calculates an expected value of measurement with respect to data that is applied to the automobile 1001. The verification unit 2014 performs processing related to verification of a measurement value of the automobile 1001. The key generation unit 2015 generates a key. The cryptographic processing unit 2016 performs encryption of data and decryption of encrypted data.

A function of the server device 2000 is realized when a central processing unit (CPU) provided in the server device 2000 executes a computer program. Also, the server device 2000 may be configured by using a general-purpose computer device, or as a dedicated hardware device.

Figure 3:
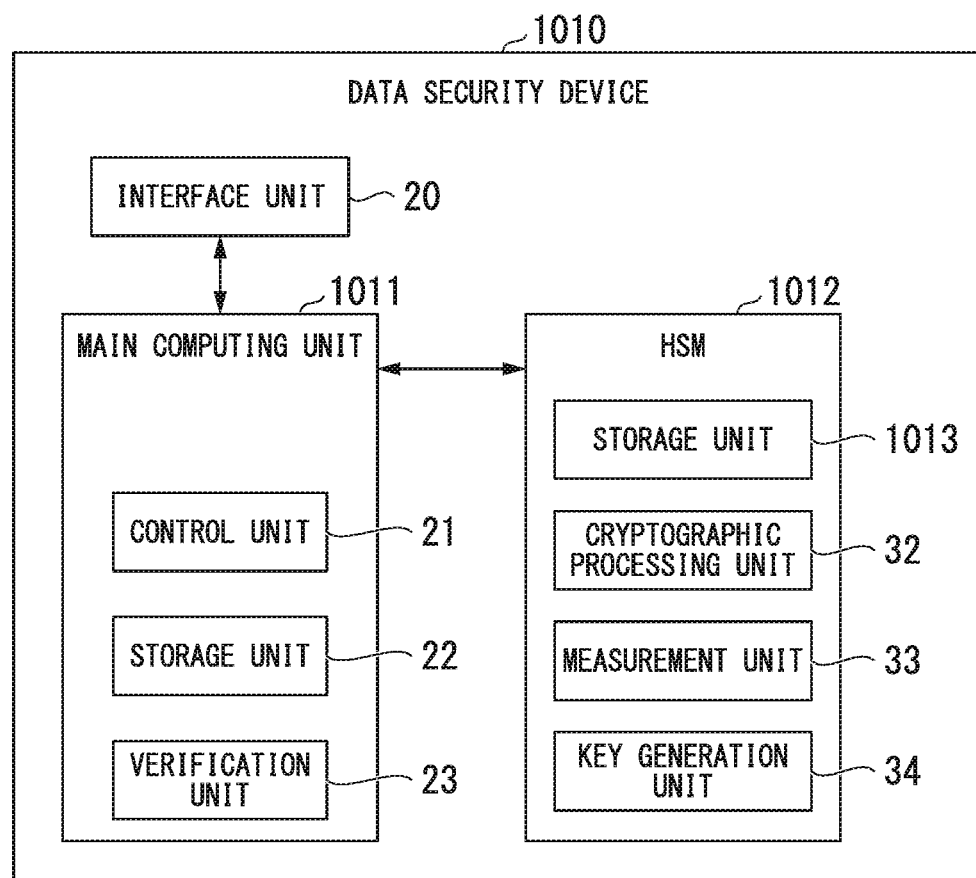
FIG. 3 is a view illustrating a configuration example of a data security device 1010 according to this embodiment.

FIG. 3 is a view illustrating a configuration example of the data security device 1010. In FIG. 3, the data security device 1010 includes the main computing unit 1011, the HSM 1012, and the interface unit 20. The main computing unit 1011 includes a control unit 21, a storage unit 22, and a verification unit 23. The HSM 1012 includes a storage unit 1013, a cryptographic processing unit 32, a measurement unit 33, and a key generation unit 34.

The interface unit 20 transmits and receives data to and from an external device of the host data security device 1010. The interface unit 20 includes an interface that transmits and receives data via the CAN 1030, an interface that transmits and receives data to and from the infotainment device 1040, an interface that transmits and receives data to and from the TCU 1050, and an interface that transmits and receives data via the diagnostic port 1060. The main computing unit 1011 transmits and receives data to and from a device other than the data security device 1010 via the interface unit 20.

The control unit 21 performs control of the data security device 1010. The storage unit 22 stores data. The verification unit 23 performs processing related to verification of a measurement value. The storage unit 1013 stores data. The cryptographic processing unit 32 performs encryption of data and decryption of encrypted data. The measurement unit 33 performs measurement of data that is applied to the data security device 1010. The key generation unit 34 generates a key.

Figure 4:
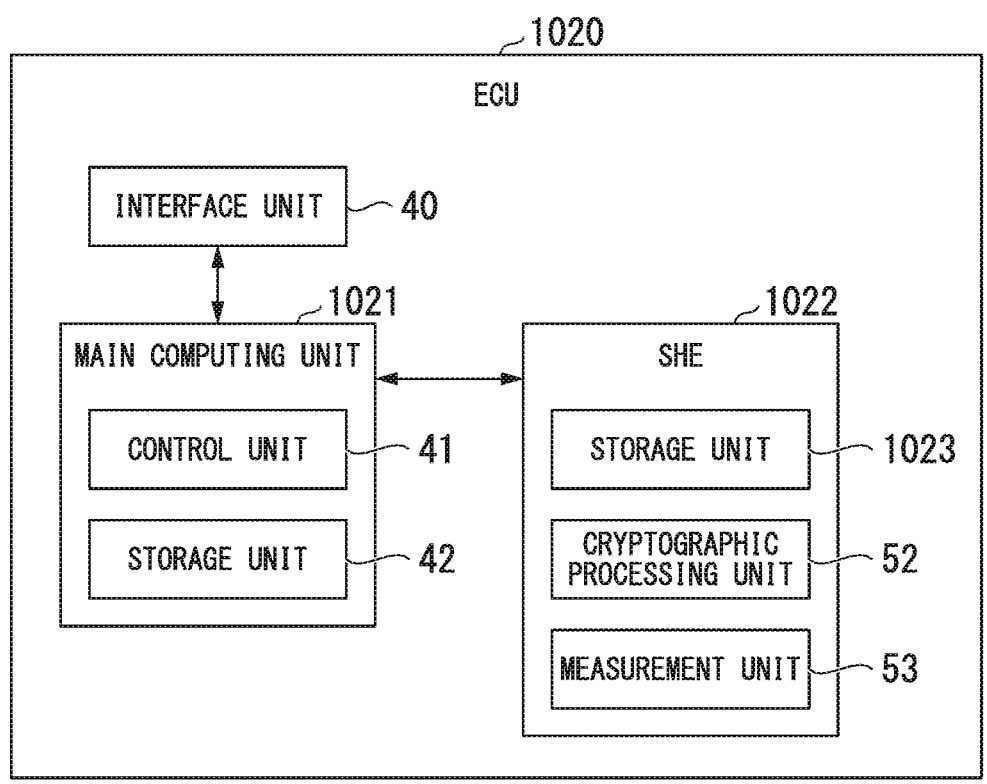
FIG. 4 is a view illustrating a configuration example of an ECU 1020 according to this embodiment.

FIG. 4 is a view illustrating a configuration example of the ECU 1020. In FIG. 4, the ECU 1020 includes the main computing unit 1021, the SHE 1022, and an interface unit 40. The main computing unit 1021 includes a control unit 41, and a storage unit 42. The SHE 1022 includes a storage unit 1023, a cryptographic processing unit 52, and a measurement unit 53.

The interface unit 40 transmits and receives data to and from an external device of the host ECU 1020. The interface unit 40 includes an interface that transmits and receives data via the CAN 1030. The main computing unit 1021 transmits and receives data to and from a device other than the host ECU 1020 via the interface unit 40.

The control unit 41 performs control of the ECU 1020. The storage unit 42 stores data. The storage unit 1023 stores data. The cryptographic processing unit 52 performs encryption of data and decryption of encrypted data. The measurement unit 53 performs measurement of data that is applied to the host ECU 1020.

Furthermore, in this embodiment, the HSM is used in the data security device 1010, but the SHE may be used instead of the HSM in the data security device 1010. Also, the SHE is described, for example, in Non-Patent Literature 3.

[Configuration Example of ECU Identifier]

A configuration example of an ECU identifier according to this embodiment will be described. The ECU identifier is information that identifies the ECU. In this embodiment, the ECU identifier is configured so that it is easy to understand an ECU identifier of a used ECU.

<Configuration Example 1 of ECU Identifier>

In Configuration Example 1 of the ECU identifier, a bit length of the ECU identifier is set to 113 bits. Details of bits of the ECU identifier will be described below.

Vehicle identification number (VIN): 102 bits (alphanumeric characters of 17 digits, one character corresponds to six bits)

CAN identifier: 11 bits 11 bits of the CAN identifier represent a CAN identifier that is stored in an ID field having a length of 11 bits in a data frame of a standard format of the CAN. Alternatively, 11 bits of the CAN identifier represent a CAN identifier that is stored in a base ID field having a length of 11 bits in a data frame of an extended format of the CAN. Furthermore, the vehicle identification number (VIN) is described, for example, in Non-Patent Literature 2.

<Configuration Example 2 of ECU Identifier>

In a Configuration Example 2 of the ECU identifier, the bit length of the ECU identifier is set to 131 bits. Details of the bits of the ECU identifier will be described below.

Vehicle identification number (VIN): 102 bits (alphanumeric characters of 17 digits, one character corresponds to six bits)

CAN identifier: 29 bits 29 bits of the CAN identifier are the sum of "11 bits" of a CAN identifier portion that is stored in the base ID field having a length of 11 bits in the data frame of the extended format of the CAN, and "18 bits" of a CAN identifier portion that is stored in the extend ID field having a length of 18 bits.

<Configuration Example 3 of ECU Identifier>

In a Configuration Example 3 of the ECU identifier, the bit length of the ECU identifier is set to 113 bits. Details of the bits of the ECU identifier will be described below.

Remaining portion other than a world manufacturer identifier (WMI) of the vehicle identification number (VIN): 84 bits (alphanumeric characters of 14 digits, one character corresponds to six bits)

CAN identifier: 29 bits 29 bits of the CAN identifier are the sum of "11 bits" of a CAN identifier portion that is stored in the base ID field having a length of 11 bits in the data frame of the extended format of the CAN, and "18 bits" of a CAN identifier portion that is stored in the extend ID field having a length of 18 bits.

<Configuration Example 4 of ECU Identifier>

In a Configuration Example 4 of the ECU identifier, a UID of the SHE that is provided in the ECU is used as the ECU identifier of the ECU.

Identifier (UID) of the SHE: 120 bits

In the Configuration Example 4 of the ECU identifier, a bit length of the ECU identifier is 120 bits.

The vehicle identification number (VIN), the CAN identifier, and the UID of the SHE are acquired, for example, in a manufacturing factory of the automobile 1001. In Configuration Examples 1, 2, and 3 of the ECU identifier, the ECU identifier includes the vehicle identification number (VIN). According to this, in Configuration Examples 1, 2, and 3 of the ECU identifier, when an automobile on which the ECU is installed is changed, the ECU identifier is also changed. On the other hand, in Configuration Example 4 of the ECU identifier, since the UID of the SHE that is provided in the EUC is the ECU identifier of the ECU, even when an automobile on which the ECU is installed is changed, the ECU identifier is the same in each case without being changed.

[Example of Reuse Method]

Next, examples of the reuse method according to this embodiment will be described. In the following description on the examples of the reuse method, as an example of the ECU identifier, Configuration Example 4 of the above-described ECU identifier, that is, the UID of the SHE that is provided in the ECU is used as the ECU identifier of the ECU. Accordingly, the ECU identifier of the ECU is the same in each case even when an automobile on which the ECU is installed is changed.

<Example 1 of Reuse Method>

Figure 5:
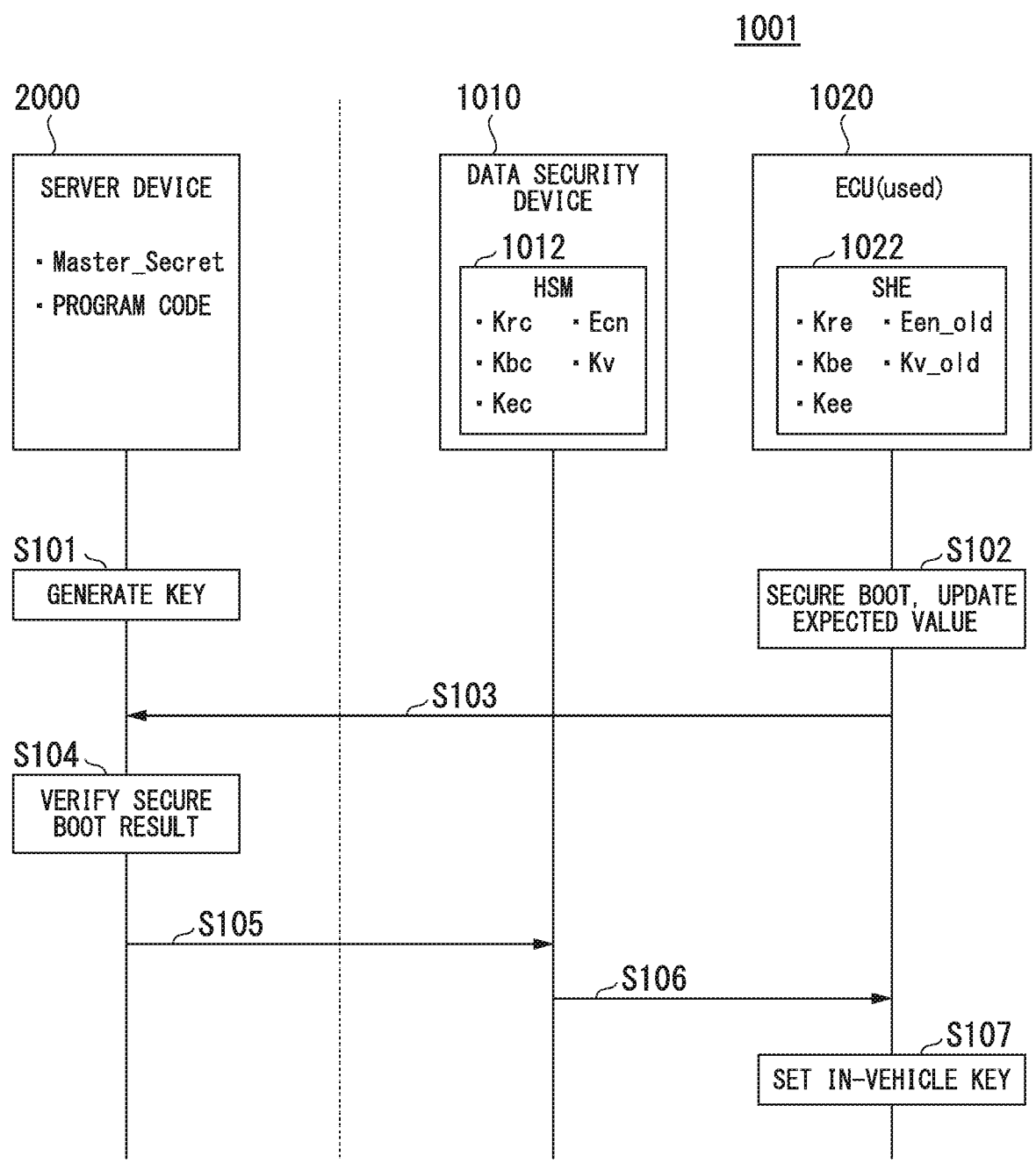
FIG. 5 is a sequence chart illustrating Example 1 of a reuse method according to this embodiment.

FIG. 5 is a sequence chart illustrating Example 1 of the reuse method according to this embodiment. Example 1 of the reuse method according to this embodiment will be described with reference to FIG. 5. Example 1 of the reuse method corresponds to a case where a used ECU is reused. Hereinafter, the used ECU is referred to as "ECU (used)".

In FIG. 5, an ECU (used) 1020 is detached from an arbitrary automobile (corresponding to a first vehicle) (not illustrated) and is installed in the automobile 1001 (corresponding to a second vehicle). The server device 2000 stores a master key Master_Secret, and a program code in the storage unit 2012 in advance. The program code may be a computer program such as an update program, or may be setting data such as a parameter setting value. The program code that is stored in the storage unit 2012 includes an ECU code that is applied to the ECU (used) 1020 at a point of time at which the ECU (used) 1020 is installed in the automobile 1001. The ECU code is a program code of the ECU.

The data security device 1010 stores a root key Krc, a signature key Kbc, an encryption key Kec, an expected value Ecn, and an in-vehicle key Kv in the storage unit 1013 of the HSM 1012 in advance. The ECU (used) 1020 stores a root key Kre, a signature key Kbe, an encryption key Kee, an expected value Een_old, and an in-vehicle key Kv_old in the storage unit 1023 of the SHE 1022 in advance.

Hereinafter, the server device 2000 performs communication with the TCU 1050 of the automobile 1001 through the communication unit 2011, and transmits and receives data to and from the data security device 1010 of the automobile 1001 via the TCU 1050. In addition, the data security device 1010 and the ECU (used) 1020 perform transmission and reception of data via the CAN 1030. Also, as a communication path between the server device 2000 and the data security device 1010, an encryption communication path may be used. For example, the server device 2000 and the data security device 1010 may perform hypertext transfer protocol secure (https) communication as an example of the encryption communication path.

(Step S101) The key generation unit 2015 of the server device 2000 generates the root key Krc of the data security device 1010 installed in the automobile 1001, and the root key Kre and the signature key Kbe of the ECU (used) 1020 installed in the automobile 1001.

An example of a key generation method in the key generation unit 2015 will be described. The key generation unit 2015 generates a key (common key) by the following expression by using the master key Master_Secret stored in the storage unit 2012, an identifier UNIT_ID of a key creation target device, and a variable Nk.

Common key=digest(Master Secret,UNIT_ID,$Nk$)

However, in a case where the key creation target device is the data security device 1010, the UNIT_ID is a device identifier SecU_ID of the data security device 1010. In a case where the key creation target device is the ECU 1020, the UNIT_ID is an ECU identifier ECU_ID of the ECU 1020. The digest (Master Secret, UNIT_ID, Nk) is a digest value that is generated on the basis of the master key Master_Secret, the identifier UNIT_ID, and the variable Nk. Examples of the digest value include a value that is calculated by a hash function, a value that is calculated by an exclusive-or operation, and the like. For example, the common key is a hash function value that is calculated by using the master key Master_Secret, the identifier UNIT_ID, and the variable Nk as an input value.

When the value of the variable Nk is different, the digest value is different. It is possible to generate a different common key on the basis of the same master key Master_Secret and identifier UNIT_ID by changing the value of the variable Nk. For example, a value of the variable Nk for a root key is set to Nk_z, a value of the variable Nk for a signature key is set to Nk_a, and a value of the variable Nk for an encryption key is set to Nk_b. The key generation unit 2015 can generate the root key Krc, the signature key Kbc, and the encryption key Kec of the data security device 1010 as keys different from each other by using the master key Master_Secret, the identifier SecU_ID of the data security device 1010, and variables Nk_z, Nk_a, and Nk_b with the following expressions.

Root key Krc=digest(Master Secret, SecU_ID, Nk_z)

Signature key Kbc=digest(Master Secret, SecU_ID, Nk_a)

Encryption key Kec=digest(Master Secret, SecU_ID, Nk_b)

In addition, the key generation unit 2015 can generate the root key Kre, the signature key Kbe, and the encryption key Kee of the ECU 20 as keys different from each other by using the master key Master_Secret, the identifier ECU_ID of the ECU 1020, and the variables Nk_z, Nk_a, and Nk_b with the following expressions.

Root key Kre=digest(Master_Secret, ECU_ID, Nk_z)

Signature key Kbe=digest(Master Secret, ECU_ID, Nk_a)

Encryption key Kee=digest(Master Secret, ECU_ID, Nk_b)

The storage unit 2012 stores the root key Krc of the data security device 1010, and the root key Kre and the signature key Kbe of the ECU (used) 1020. The storage unit 1013 of the HSM 1012 of the data security device 1010 stores, in advance, the root key Krc that is generated by the same key generation method as in the server device 2000. The storage unit 1023 of the SHE 1022 of the ECU (used) 1020 stores, in advance, the root key Kre and the signature key Kbe which are generated by the same key generation method as in the server device 2000.

(Step S102) The control unit 41 of the ECU (used) 1020 executes secure boot after being installed in the automobile 1001. In the secure boot, the measurement unit 53 of the SHE 1022 calculates a measurement value of an ECU code with the signature key Kbe that is stored in the storage unit 1023. In this embodiment, as an example of the measurement value, a cipher-based message authentication code (CMAC) is used. Accordingly, the measurement unit 53 calculates a CMAC of the ECU code with the signature key Kbe stored in the storage unit 1023. A CMAC as the calculation result is referred to as a measurement value Een_a. The SHE 1022 transmits the measurement value Een_a to the control unit 41. The control unit 41 updates an expected value Een_old stored in the storage unit 1023 of the SHE 1022 with the measurement value Een_a. According to this, the expected value Een_old stored in the storage unit 1023 is rewritten with the measurement value Een_a. According to this, an expected value that is stored in the storage unit 1023 after the updating is the measurement value Een_a.

(Step S103) The control unit 41 of the ECU (used) 1020 transmits the measurement value Een_a to the SHE 1022 to cause the SHE 1022 to execute encryption. The cryptographic processing unit 52 of the SHE 1022 encrypts the measurement value Een_a with the root key Kre stored in the storage unit 1023 to generate encrypted data Kre(Een_a). The SHE 1022 transmits the encrypted data Kre(Een_a) to the control unit 41. The control unit 41 transmits the encrypted data Kre(Een_a) to the server device 2000 via the CAN 1030 and the data security device 1010 through the interface unit 40. The server device 2000 receives the encrypted data Kre(Een_a) from the data security device 1010 of the automobile 1001. The measurement value Een_a is an example of a secure boot result. That is, the ECU (used) 1020 transmits the secure boot result to the server device 2000.

(Step S104) The cryptographic processing unit 2016 of the server device 2000 decrypts the encrypted data Kre (Een_a) with the root key Kre stored in the storage unit 2012, and acquires the measurement value Een_a. Also, the ECU (used) 1020 may transmit the measurement value Een_a to the server device 2000 as it is without encrypting the measurement value Een_a.

The expected value calculation unit 2013 calculates CMAC with respect to the ECU code of the ECU (used) 1020 which is stored in the storage unit 2012 with the signature key Kbe that is stored in the storage unit 2012. A CMAC as the calculation result is referred to as an expected value Een_b. The verification unit 2014 compares the measurement value Een_a and the expected value Een_b with each other to determine whether or not both the values match each other. From a result of the determination, in a case where both the values match each other, verification of the measurement value Een_a is "passing". In a case where verification of the measurement value Een_a is "passing", the processing proceeds to step S105. On the other hand, in a case where both the values do not match each other, verification of the measurement value Een_a is "failure". In a case where verification of the measurement value Een_a is "failure", the processing in FIG. 5 is terminated with respect to the ECU (used) 1020. Accordingly, in a case where verification of the measurement value Een_a is "failure", processing subsequent to step S105 is not executed with respect to the ECU (used) 1020. In addition, in a case where verification of the measurement value Een_a is "failure", the server device 2000 may execute predetermined error processing.

(Step S105) The server device 2000 transmits an in-vehicle key transmission request message to the data security device 1010 of the automobile 1001. The in-vehicle key transmission request message is a message for making a request for transmission of the in-vehicle key Kv to the ECU (used) 1020 which passes in verification of the measurement value Een_a. The in-vehicle key transmission request message includes the root key Kre of the ECU (used) 1020. It is preferable that the server device 2000 encrypts the root key Kre with the root key Krc of the data security device 1010 by the cryptographic processing unit 2016, and stores encrypted data Krc(Kre) of the root key Kre in the in-vehicle key transmission request message. The data security device 1010 of the automobile 1001 receives the in-vehicle key transmission request message from the server device 2000.

(Step S106) The control unit 21 of the data security device 1010 transmits the root key Kre of the ECU (used) 1020, which is included in the in-vehicle key transmission request message, to the HSM 1012, and cases the HSM 1012 to execute encryption of the in-vehicle key Kv. Also, in a case where the root key Kre of the ECU (used) 1020, which is included in the in-vehicle key transmission request message, is encrypted, the control unit 21 transmits the encrypted data Krc(Kre) of the root key Kre to the HSM 1012 to cause the HSM 1012 to decrypt the root key Krc, thereby acquiring the root key Kre of the ECU (used) 1020.

The cryptographic processing unit 32 of the HSM 1012 encrypts the in-vehicle key Kv stored in the storage unit 1013 with the root key Kre of the ECU (used) 1020 to generate encrypted data Kre(Kv). The HSM 1012 transmits the encrypted data Kre(Kv) to the control unit 21. The control unit 21 transmits the encrypted data Kre(Kv) to the ECU (used) 1020 through the interface unit 20. The ECU (used) 1020 receives the encrypted data Kre(Kv) from the data security device 1010 through the interface unit 40.

(Step S107) The control unit 41 of the ECU (used) 1020 transmits the encrypted data Kre(Kv) to the SHE 1022 to cause the SHE 1022 to execute decryption. The cryptographic processing unit 52 of the SHE 1022 decrypts the encrypted data Kre(Kv) with the root key Kre stored in the storage unit 1023 to acquire the in-vehicle key Kv. The SHE 1022 updates the in-vehicle key Kv_old stored in the storage unit 1023 with the in-vehicle key Kv. According to this, the in-vehicle key Kv_old stored in the storage unit 1023 is rewritten with the in-vehicle key Kv. According to this, an in-vehicle key that is stored in the storage unit 1023 after the updating is the in-vehicle key Kv. According to this, the ECU (used) 1020 stores the in-vehicle key Kv that is common to the data security device 1010 and each of the ECUs 1020 of the automobile 1001.

Respective steps in FIG. 5 are executed with respect to all of the ECUs (used) 1020 which are installed in the automobile 1001 in a similar manner. In Example 1 of this reuse method, the in-vehicle key Kv is an example of first data that is applied to the ECU (used) 1020. In addition, the root key Kre is an example of a first key. In addition, the signature key Kbe is an example of a second key.

According to Example 1 of the reuse method, the prior in-vehicle key Kv_old of the ECU (used) 1020 installed in the automobile 1001 is updated with the in-vehicle key Kv that is used in the automobile 1001. According to this, the ECU (used) 1020 can perform safe communication with another ECU 1020 and the data security device 1010 of the automobile 1001 by using the in-vehicle key Kv. This exhibits an effect that contributes to an improvement of reliability of the automobile 1001 on which the ECU (used) 1020 is installed.

<Modification Example a of Example 1 of Reuse Method>

Figure 6:
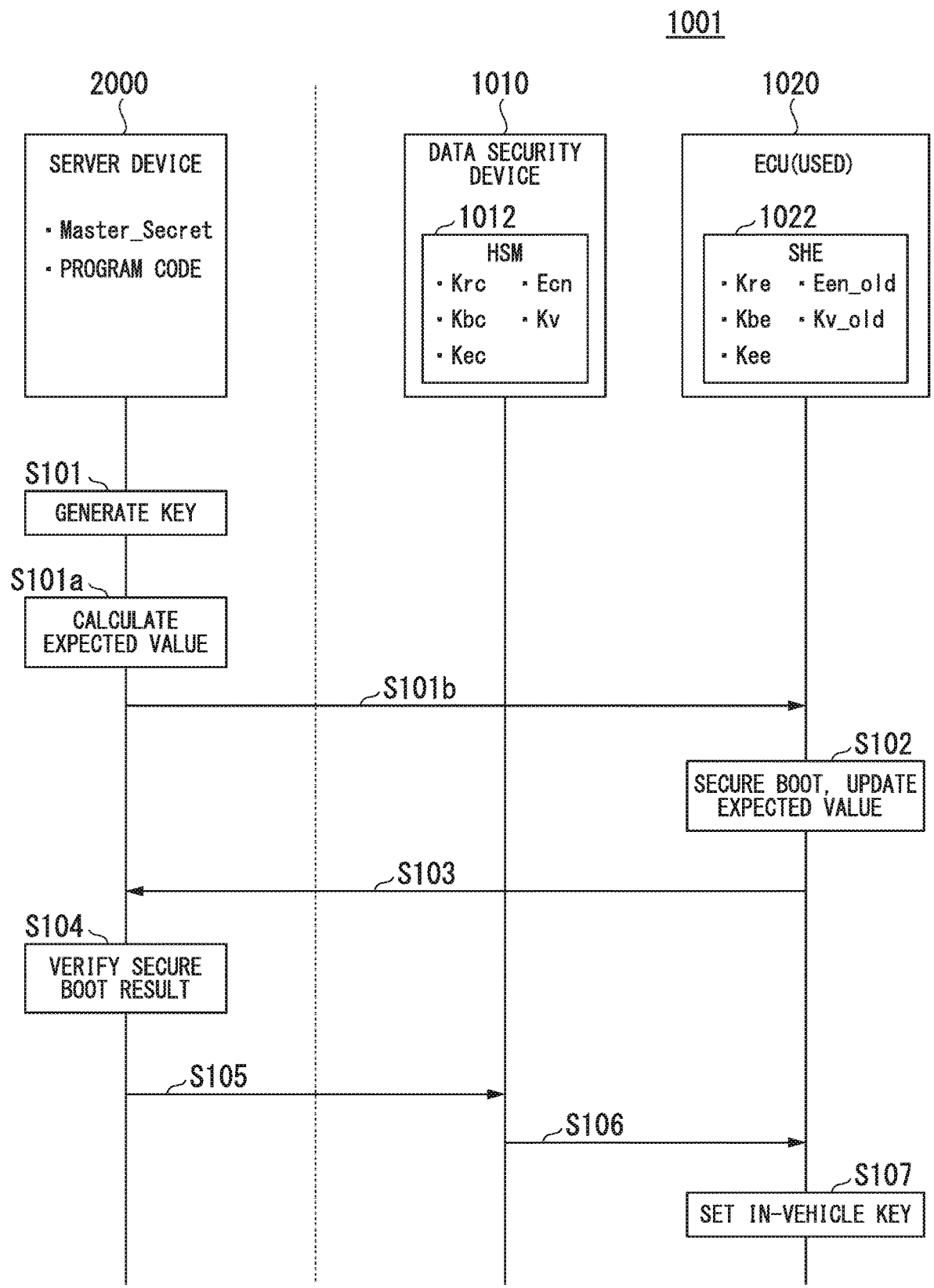
FIG. 6 is a sequence chart illustrating Modification Example a of Example 1 of the reuse method according to this embodiment.

FIG. 6 is a sequence chart illustrating Modification Example a of Example 1 of the reuse method. The modification Example a of Example 1 of the reuse method will be described with reference to FIG. 6. In FIG. 6, the same reference numerals will be given to portions corresponding to the respective steps in FIG. 5. In Modification Example a of Example 1 of the reuse method, the expected value of measurement of the secure boot of the ECU (used) 1020 is supplied from the server device 2000 to the ECU (used) 1020.

In FIG. 6, step S101 is executed. Step S101 is the same as in Example 1 of the reuse method.

(Step S101a) After step S101, the expected value calculation unit 2013 of the server device 2000 calculates a CMAC with respect to the ECU code of the ECU (used) 1020, which is stored in the storage unit 2012, with the signature key Kbe that is stored in the storage unit 2012. The CMAC of the calculation result is an expected value Een_b.

(Step S101b) The server device 2000 transmits the expected value Een_b to the ECU (used) 1020.

(Step S102) The ECU (used) 1020 updates the expected value Een_old stored in the storage unit 1023 of the SHE 1022 with the expected value Een_b received from the server device 2000. According to this, the expected value Een_old stored in the storage unit 1023 is rewritten with the expected value Een_b. Accordingly, an expected value that is stored in the storage unit 1023 after the updating is the expected value Een_b. The ECU (used) 1020 compares the measurement value Een_a of the secure boot and the expected value Een_b stored in the storage unit 1023 to determine whether or not both the values match each other. From a result of the determination, in a case where both the values match each other, a secure boot result is "passing". On the other hand, in a case where both the values do not match each other, the secure boot result is "failure".

(Step S103) The ECU (used) 1020 transmits the secure boot result of "passing or failure" to the server device 2000.

(Step S104) The server device 2000 determines whether or not the ECU (used) 1020 passes in the secure boot with the secure boot result received from the ECU (used) 1020. In a case where the secure boot result received from the ECU (used) 1020 is "passing", the processing proceeds to step S105. On the other hand, in a case where the secure boot result received from the ECU (used) 1020 is "failure", the processing of FIG. 6 is terminated with respect to the ECU (used) 1020. Accordingly, in a case where the secure boot result is "failure", processing subsequent to step S105 is not executed with respect to the ECU (used) 1020. In addition, in a case where the secure boot result is "failure", the server device 2000 may execute predetermined error processing.

Next, steps S105, S106, and S107 are executed. Steps S105, S106, and S107 are the same as in Example 1 of the reuse method.

Furthermore, the server device 2000 may supply a verification value (for example, a random number) to the ECU (used) 1020 in advance. In addition, in step S103, the ECU (used) 1020 allows the verification value to be included in the secure boot result of "passing" in a case where the secure boot result is "passing", and does not allow the verification value to be included in the secure boot result of "failure" in a case where the secure boot result is "failure". The verification unit 2014 of the server device 2000 compares the verification value included in the secure boot result of "passing" of the ECU (used) 1020 and an original verification value that is supplied to the ECU (used) 1020 in advance. From a result of the comparison, in a case where both the values match each other, the verification unit 2014 of the server device 2000 determines that the secure boot result of the ECU (used) 1020 is "passing". In a case where both the values do not match each other, the verification unit 2014 determines that the secure boot result of the ECU (used) 1020 is "failure".

In addition, the ECU (used) 1020 may encrypt the secure boot result by the cryptographic processing unit 52 of the SHE 1022 and may transmit the encrypted secure boot result to the server device 2000. The encryption key Kee that is used in the encryption is shared between the server device 2000 and the ECU (used) 1020 in advance. The server device 2000 decrypts the encrypted data transmitted from the ECU (used) 1020 by the cryptographic processing unit 2016 with the encryption key Kee stored in the storage unit 2012 to acquire the secure boot result. Furthermore, the encryption key Kee may be a key that can be used in the SHE 1022 only in a case where the secure boot result is "passing". In this case, the cryptographic processing unit 52 of the SHE 1022 encrypts the secure boot result of "passing" with the encryption key Kee.

Hereinbefore, Modification Example a of Example 1 of the reuse method has been described.

<Example 2 of Reuse Method>

Figure 7:
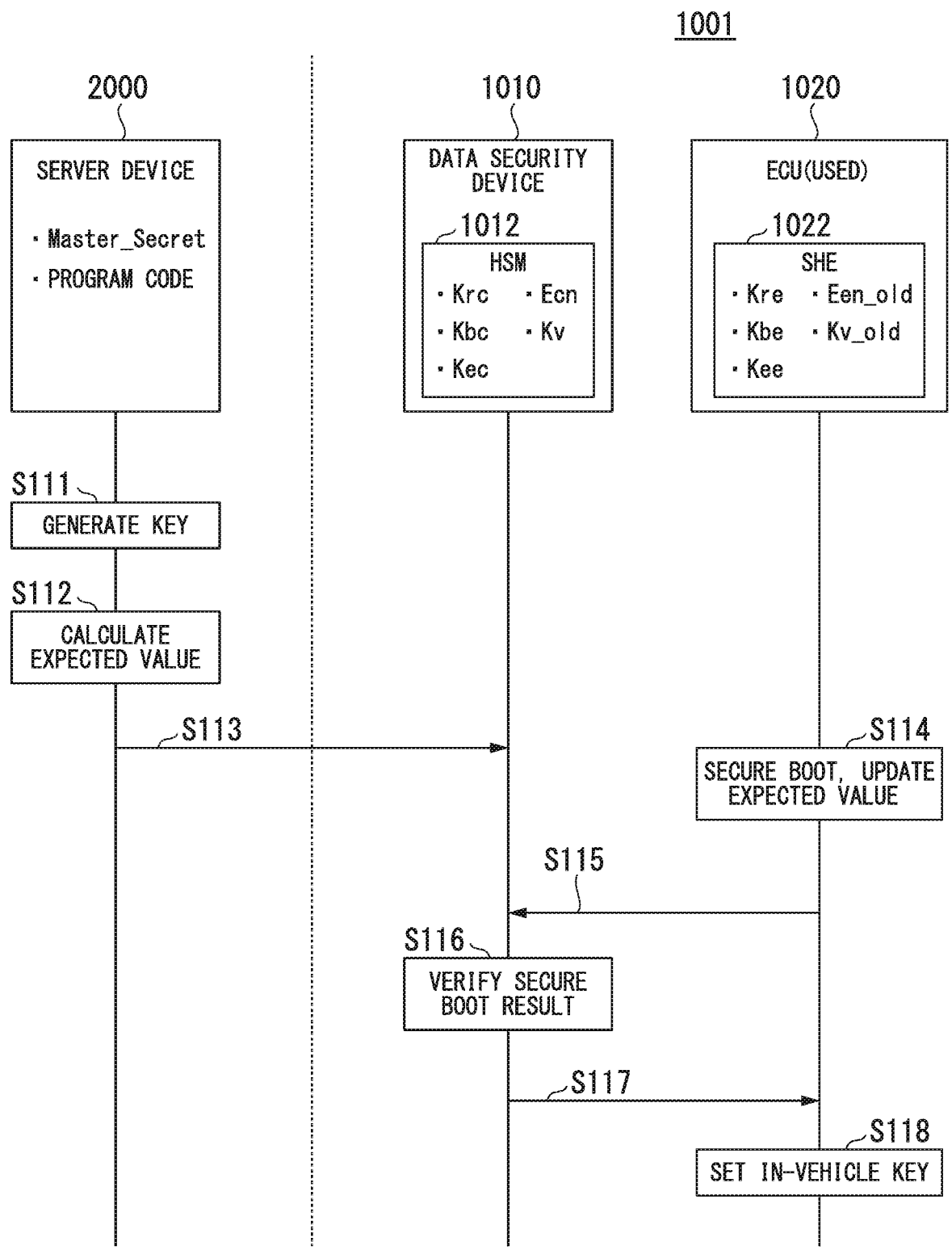
FIG. 7 is a sequence chart illustrating Example 2 of the reuse method according to this embodiment.

FIG. 7 is a sequence chart illustrating Example 2 of the reuse method according to this embodiment. Example 2 of the reuse method according to this embodiment will be described with reference to FIG. 7. Example 2 of the reuse method corresponds to a case of using a used ECU (ECU (used)) again in a similar manner as in Example 1 of the reuse method. Example 2 of the reuse method is different from Example 1 of the reuse method in that the verification of the secure boot result of the ECU (used) 1020 is performed by the data security device 1010. Hereinafter, a difference from Example 1 of the reuse method will be mainly described.

In FIG. 7, the ECU (used) 1020 is detached from an arbitrary automobile (corresponding to the first vehicle) (not illustrated) and is installed in the automobile 1001 (corresponding to the second vehicle). The server device 2000 stores the master key Master_Secret, and the program code in the storage unit 2012 in advance. The program code stored in the storage unit 2012 includes an ECU code that is applied to the ECU (used) 1020 at the point of time at which the ECU (used) 1020 is installed in the automobile 1001.

The data security device 1010 stores the root key Krc, the signature key Kbc, the encryption key Kec, the expected value Ecn, and the in-vehicle key Kv in the storage unit 1013 of the HSM 1012 in advance. The ECU (used) 1020 stores the root key Kre, the signature key Kbe, the encryption key Kee, the expected value Een_old, and the in-vehicle key Kv_old in the storage unit 1023 of the SHE 1022 in advance.

Hereinafter, the server device 2000 transmits and receives data to and from the data security device 1010 of the automobile 1001 through the TCU 1050 of the automobile 1001. In addition, the data security device 1010 and the ECU (used) 1020 perform transmission and reception of data through the CAN 1030. Furthermore, the server device 2000 and the data security device 1010 may perform https communication as an example of the encryption communication path.

(Step S111) The key generation unit 2015 of the server device 2000 generates the root key Krc of the data security device 1010 installed in the automobile 1001, and the root key Kre and the signature key Kbe of the ECU (used) 1020 installed in the automobile 1001. Processing related to generation of the keys is the same as in step S101 of Example 1 of the reuse method in FIG. 5. The storage unit 2012 stores the root key Krc of the data security device 1010, and the root key Kre and the signature key Kbe of the ECU (used) 1020. The storage unit 1013 of the HSM 1012 of the data security device 1010 stores the root key Krc that is generated by the same key generation method as in in the server device 2000 in advance. The storage unit 1023 of the SHE 1022 of the ECU (used) 1020 stores the root key Kre and the signature key Kbe which are generated by the same key generation method as in the server device 2000 in advance.

(Step S112) The expected value calculation unit 2013 of the server device 2000 calculates the CMAC with respect to the ECU code of the ECU (used) 1020 which is stored in the storage unit 2012 with the signature key Kbe stored in the storage unit 2012. The CMAC that is the calculation result is the expected value Een_b.

(Step S113) The server device 2000 transmits the expected value Een_b and the root key Kre of the ECU (used) 1020 to the data security device 1010. The data security device 1010 receives the expected value Een_b and the root key Kre of the ECU (used) 1020 from the server device 2000. The storage unit 22 of the data security device 1010 stores the expected value Een_b received from the server device 2000. The storage unit 1013 of the HSM 1012 of the data security device 1010 stores the root key Kre of the ECU (used) 1020 which is received form the server device 2000

Furthermore, it is preferable that the server device 2000 encrypts the root key Kre with the root key Krc of the data security device 1010 by the cryptographic processing unit 2016, and transmits encrypted data Krc(Kre) of the root key Kre to the data security device 1010. The HSM 1012 of the data security device 1010 decrypts the encrypted data Krc (Kre) of the root key Kre with the root key Krc by the cryptographic processing unit 32 to acquire the root key Kre of the ECU (used) 1020. Similarly, the expected value Een_b may be encrypted with the root key Krc of the data security device 1010, and may be transmitted from the server device 2000 to the data security device 1010.

(Step S114) The control unit 41 of the ECU (used) 1020 executes updating of the secure boot and the expected value after being installed in the automobile 1001. Processing related to the updating of the secure boot and the expected value is the same as in step S102 of Example 1 of the reuse method in FIG. 5.

(Step S115) The ECU (used) 1020 transmits encrypted data Kre(Een_a) of the measurement value Een_a as a secure boot result to the data security device 1010. That is, the ECU (used) 1020 transmits a result of the secure boot to the data security device 1010. The encryption-processing of the measurement value Een_a is the same as in step S103 of Example 1 of the reuse method in FIG. 5. The data security device 1010 receives the encrypted data Kre(Een_a) from the ECU (used) 1020.

(Step S116) The control unit 21 of the data security device 1010 transmits the encrypted data Kre(Een_a) to the HSM 1012 to cause the HSM 1012 to execute decryption. The cryptographic processing unit 32 of the HSM 1012 decrypts the encrypted data Kre(Een_a) with the root key Kre of the ECU (used) 1020 which is stored in the storage unit 1013 to acquire the measurement value Een_a. Also, the ECU (used) 1020 may transmit the measurement value Een_a to the data security device 1010 as it is without encrypting the measurement value Een_a.

The verification unit 23 of the data security device 1010 compares the measurement value Een_a acquired by the HSM 1012 and the expected value Een_b stored in the storage unit 22 to determine whether or not both the values match each other. From a result of the determination, in a case where both the values match each other, verification of the measurement value Een_a is "passing". In a case where verification of the measurement value Een_a is "passing", the processing proceeds to step S117. On the other hand, in a case where both the values do not match each other, verification of the measurement value Een_a is "failure". In a case where verification of the measurement value Een_a is "failure", the processing in FIG. 7 is terminated with respect to the ECU (used) 1020. Accordingly, in a case where verification of the measurement value Een_a is "failure", processing subsequent to step S117 is not executed with respect to the ECU (used) 1020. In addition, in a case where verification of the measurement value Een_a is "failure", the data security device 1010 may execute predetermined error processing.

(Step S117) The control unit 21 of the data security device 1010 transmits the encrypted data Kre(Kv) of the in-vehicle key Kv which is generated by the HSM 1012 to the ECU (used) 1020. The encrypted data Kre(Kv) of the in-vehicle key Kv is generated by the HSM 1012 in a similar manner as in step S106 of Example 1 of the reuse method in FIG. 5. The ECU (used) 1020 receives the encrypted data Kre(Kv) from the data security device 1010.

(Step S118) The ECU (used) 1020 sets the in-vehicle key Kv that is acquired by decryption the encrypted data Kre (Kv) received form the data security device 1010. Processing related to the setting of the in-vehicle key Kv is the same as in step S107 of Example 1 of the reuse method in FIG. 5. Through the setting of the in-vehicle key Kv, the in-vehicle key Kv_old stored in the storage unit 1023 of the SHE 1022 of the ECU (used) 1020 is rewritten with the in-vehicle key Kv, and an in-vehicle key stored in the storage unit 1023 is updated with the in-vehicle key Kv. According to this, the ECU (used) 1020 stores the in-vehicle key that is common to the data security device 1010 and each of the ECUs (used) 1020 of the automobile 1001.

Respective steps in FIG. 7 are executed with respect to all of the ECUs (used) 1020 which are installed in the automobile 1001 in a similar manner. In Example 2 of this reuse method, the in-vehicle key Kv is an example of the first data that is applied to the ECU (used) 1020. In addition, the root key Kre is an example of the first key. In addition, the signature key Kbe is an example of the second key.

According to Example 2 of the reuse method, the prior in-vehicle key Kv_old of the ECU (used) 1020 installed in the automobile 1001 is updated with the in-vehicle key Kv that is used in the automobile 1001 in a similar manner as in Example 1 of the reuse method. According to this, the ECU (used) 1020 can perform safe communication with another ECU 1020 and the data security device 1010 of the automobile 1001 by using the in-vehicle key Kv. This exhibits an effect that contributes to an improvement of reliability of the automobile 1001 on which the ECU (used) 1020 is installed.

In addition, according to Example 2 of the reuse method, the data security device 1010 performs verification of the secure boot result. According to this, as in Example 1 of the reuse method, it is possible to further realize efficiency of processing in comparison to a case where verification of the secure boot result is performed by the server device 2000 outside the automobile 1001.

<Modification Example b of Example 2 of Reuse Method>

Figure 8:
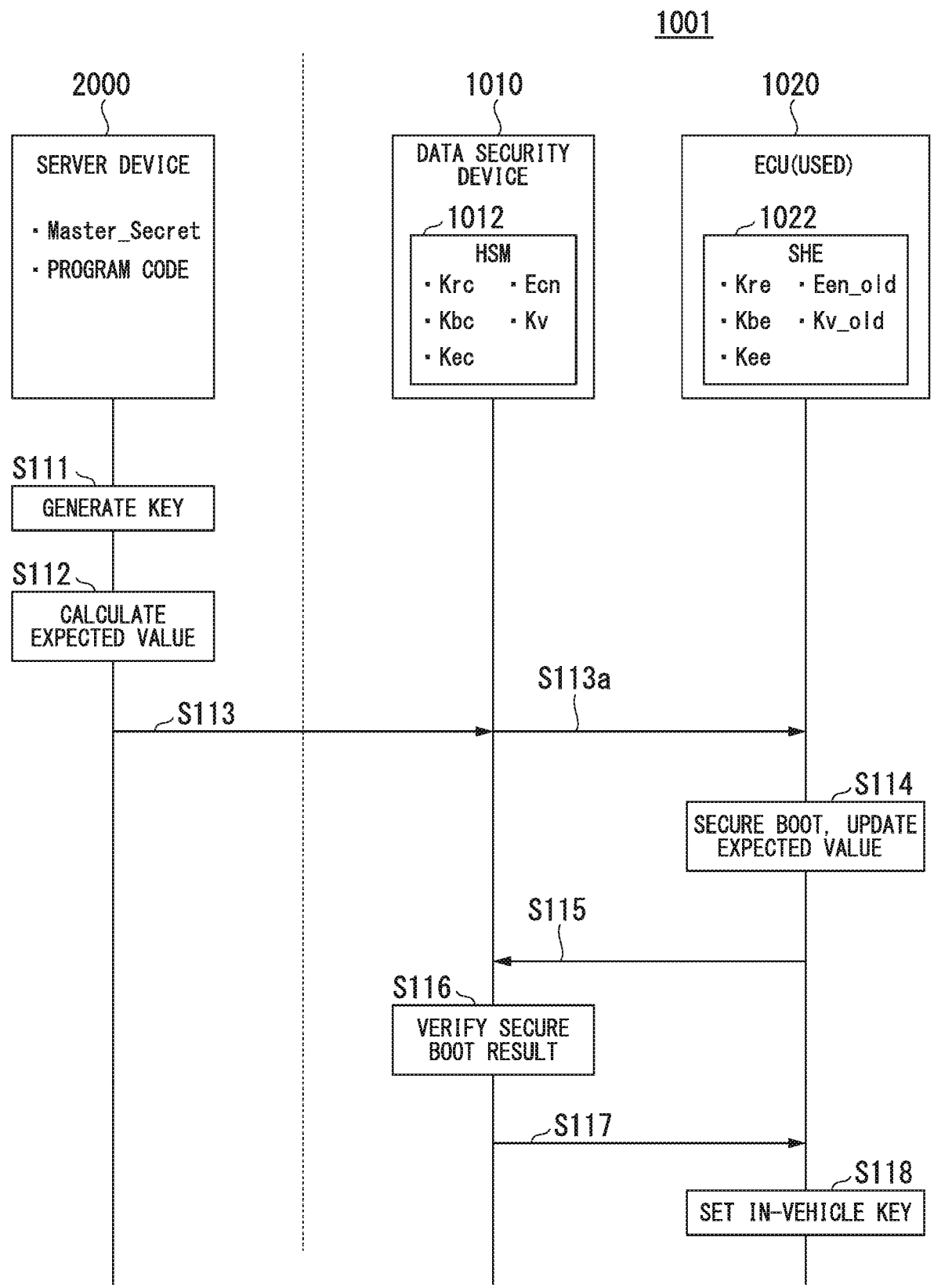
FIG. 8 is a sequence chart illustrating Modification Example b of Example 2 of the reuse method according to this embodiment.

FIG. 8 is a sequence chart illustrating Modification Example b of Example 2 of the reuse method. Modification Example b of Example 2 of the reuse method will be described with reference to FIG. 8. In FIG. 8, the same reference numeral will be given to portions corresponding to respective steps in FIG. 7. As in Modification Example a of Example 1 of the reuse method, in Modification Example b of Example 2 of the reuse method, the expected value of measurement of the secure boot of the ECU (used) 1020 is supplied from the server device 2000 to the ECU (used) 1020.

In FIG. 8, steps S111, S112, and S113 are executed. Steps S111, S112, and S113 are the same as in Example 2 of the reuse method.

(Step S113a) The data security device 1010 transmits the expected value Een_b received from the server device 2000 to the ECU (used) 1020.

(Step S114) The ECU (used) 1020 updates the expected value Een_old stored in the storage unit 1023 with the expected value Een_b received from the data security device 1010. According to this, the expected value Een_old stored in the storage unit 1023 is rewritten with the expected value Een_b. Accordingly, an expected value that is stored in the storage unit 1023 after the updating is the expected value Een_b. The ECU (used) 1020 compares the measurement value Een_a of the secure boot and the expected value Een_b stored in the storage unit 1023 to determine whether or not both the values match each other. From a result of the determination, in a case where both the values match each other, the secure boot result is "passing". On the other hand, in a case where both the values do not match each other, the secure boot result is "failure".

(Step S115) The ECU (used) 1020 transmits the secure boot result of "passing or failure" to the data security device 1010.

(Step S116) The data security device 1010 determines whether or not the ECU (used) 1020 passes in the secure boot with the secure boot result received from the ECU (used) 1020. In a case where the secure boot result received from the ECU (used) 1020 is "passing", the processing proceeds to step S117. On the other hand, in a case where the secure boot result received form the ECU (used) 1020 is "failure", the processing in FIG. 8 is terminated with respect to the ECU (used) 1020. Accordingly, in a case where the secure boot result is "failure", processing subsequent to step S117 is not executed with respect to the ECU (used) 1020. In addition, in a case where the secure boot result is "failure", the data security device 1010 may execute predetermined error processing.

Next, steps S117 and S118 are executed. Steps S117 and S118 are the same as in Example 2 of the reuse method.

Furthermore, the data security device 1010 may supply a verification value (for example, a random number) to the ECU (used) 1020 in advance. In addition, in step S115, the ECU (used) 1020 allow the verification value to be included in the secure boot result of "passing" in a case where the secure boot result is "passing", and does not allow the verification value to be included in the secure boot result of "failure" in a case where the secure boot result is "failure". The verification unit 23 of the data security device 1010 compares the verification value that is included in the secure boot result of "passing" of the ECU (used) 1020 and an original verification value that is supplied to the ECU (used) 1020 in advance. From a result of the comparison, in a case where both the values match each other, the verification unit 23 of the data security device 1010 determines that the secure boot result of the ECU (used) 1020 is "passing", and in a case where both the values do not match each other, the verification unit 23 determines that the secure boot result of the ECU (used) 1020 is "failure".

In addition, the ECU (used) 1020 may encrypt the secure boot result by the cryptographic processing unit 52 of the SHE 1022 and may transmit the encrypted secure boot result to the data security device 1010. The encryption key Kee that is used in the encryption is shared between the data security device 1010 and the ECU (used) 1020 in advance. For example, the server device 2000 supplies the encryption key Kee to the data security device 1010. The data security device 1010 decrypts the encrypted data transmitted from the ECU (used) 1020 with the encryption key Kee by the cryptographic processing unit 32 to acquire the secure boot result. Furthermore, the encryption key Kee may be a key that can be used in the SHE 1022 only in a case where the secure boot result is "passing". In this case, the cryptographic processing unit 52 of the SHE 1022 encrypts the secure boot result of "passing" with the encryption key Kee.

Hereinbefore, Modification Example b of Example 2 of the reuse method has been described.

<Example 3 of Reuse Method>

Figure 9:
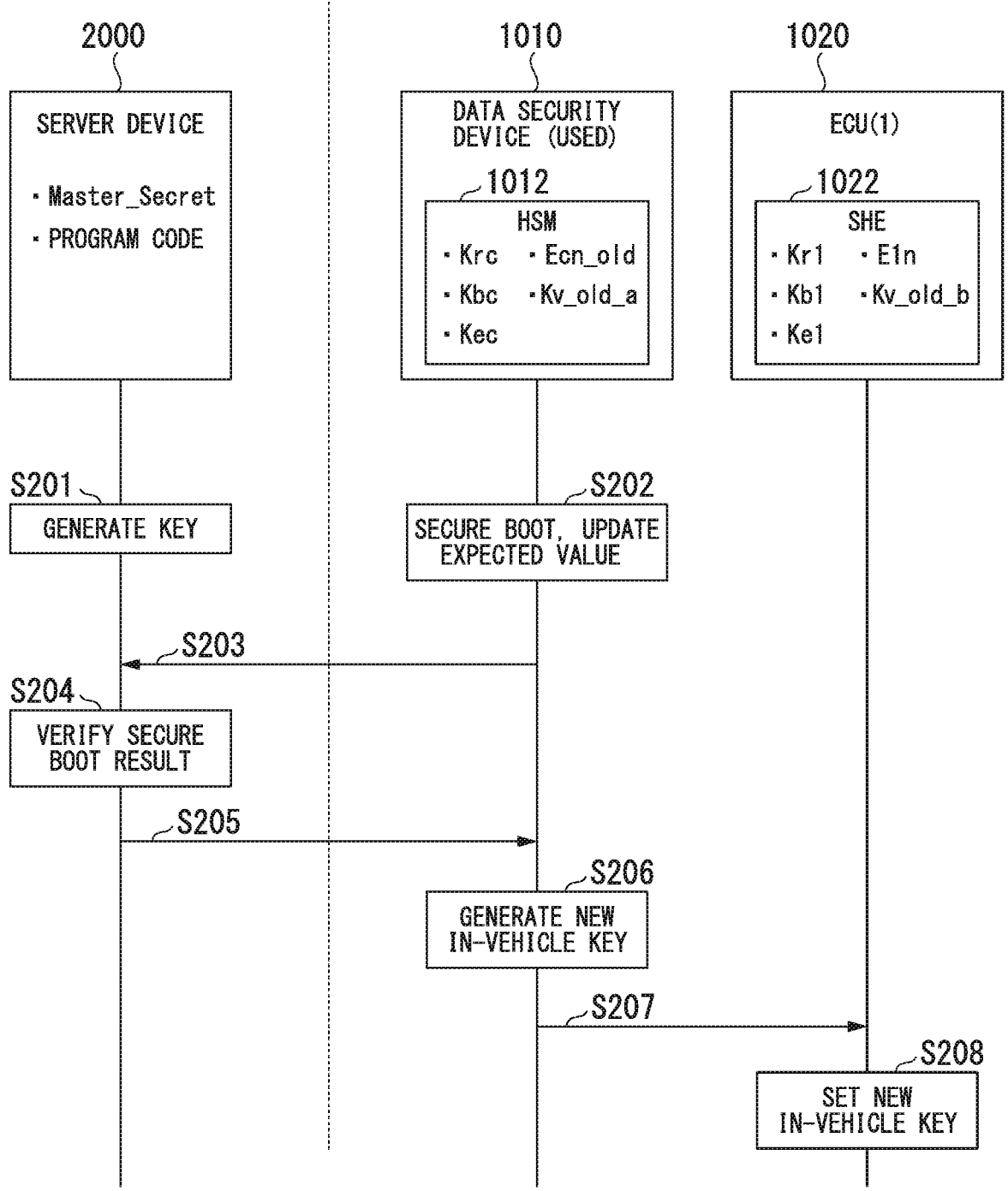
FIG. 9 is a sequence chart illustrating Example 3 of the reuse method according to this embodiment.

FIG. 9 is a sequence chart illustrating Example 3 of the reuse method according to this embodiment. Example 3 of the reuse method according to this embodiment will be described with reference to FIG. 9. Example 3 of the reuse method corresponds to a case where a used data security device is reused. Hereinafter, the used data security device is referred to as a data security device (used).

In FIG. 9, among ECU(n) 1020 which are installed in the automobile 1001, only one ECU(1) 1020 is illustrated for convenience of explanation. Where, n is an integer of 1 to N. N represents the number of the ECUs 1020, which are in-vehicle key transmission targets, among the ECUs 1020 which are installed in the automobile 1001.

In FIG. 9, the data security device (used) 1010 is detached from an arbitrary vehicle (corresponding to the first vehicle) (not illustrated) and is installed in the automobile 1001 (corresponding to the second vehicle). The server device 2000 stores the master key Master_Secret, and the program code in the storage unit 2012 in advance. The program code may be a computer program such as an update program, or may be setting data such as a parameter setting value. The program code that is stored in the storage unit 2012 includes a data security device code that is applied to the data security device (used) 1010 at a point of time at which the data security device (used) 1010 is installed in the automobile 1001. The data security device code is a program code of the data security device.

The data security device 1010 stores the root key Krc, the signature key Kbc, the encryption key Kec, an expected value Ecn_old, and an in-vehicle key Kv_old a in the storage unit 1013 of the HSM 1012 in advance. The ECU(1) 1020 stores a root key Kr1, a signature key Kb1, an encryption key Ke1, an expected value E1n, and an in-vehicle key Kv_old_b in the storage unit 1023 of the SHE 1022 in advance. The in-vehicle key Kv_old_a stored in the data security device (used) 1010 and the in-vehicle key Kv_old_b stored in the ECU(1) 1020 are different from each other.

Hereinafter, the server device 2000 performs communication with the TCU 1050 of the automobile 1001 by the communication unit 2011, and transmits and receives data to and from the data security device (used) 1010 of the automobile 1001 through the TCU 1050. Furthermore, the data security device (used) 1010 and the ECU(1) 1020 perform transmission and reception of data through the CAN 1030. Furthermore, the server device 2000 and the data security device (used) 1010 may perform https communication as an example of an encryption communication path.

(Step S201) The key generation unit 2015 of the server device 2000 generates the root key Krc and the signature key Kbc of the data security device (used) 1010 installed in the automobile 1001, and the root key Kr1 of the ECU(1) 1020 installed in the automobile 1001. The key generation method is the same as in Example 1 of the reuse method in FIG. 5. The storage unit 2012 stores the root key Krc and the signature key Kbc of the data security device (used) 1010 and the root key Kr1 of the ECU(1) 1020. The storage unit 1013 of the HSM 1012 of the data security device (used) 1010 stores, in advance, the root key Krc and the signature key Kbc which are generated by the same key generation method as in the server device 2000. The storage unit 1023 of the SHE 1022 of the ECU 1020 stores, in advance, the root key Kr1 generated by the same key generation method as in the server device 2000.

(Step S202) The control unit 21 of the data security device (used) 1010 executes secure boot after being installed in the automobile 1001. In the secure boot, the measurement unit 33 of the HSM 1012 calculates a measurement value of the data security device code with the signature key Kbc stored in the storage unit 1013. In this embodiment, as an example of the measurement value, a CMAC is used. Accordingly, the measurement unit 33 calculates a CMAC of the data security device code with the signature key Kbc stored in the storage unit 1013. The CMAC as the calculation result is referred to as a measurement value Ecn a. The HSM 1012 transmits the measurement value Ecn_a to the control unit 21. The HSM 1012 updates the expected value Ecn_old stored in the storage unit 1013 with the measurement value Ecn_a.

According to this, the expected value Ecn_old stored in the storage unit 1013 is rewritten with the measurement value Ecn_a. Accordingly, an expected value that is stored in the storage unit 1013 after the updating is the measurement value Ecn_a.

(Step S203) The control unit 21 of the data security device (used) 1010 transmits the measurement value Ecn a to the HSM 1012 to cause the HSM 1012 to execute encryption. The cryptographic processing unit 32 of the HSM 1012 encrypts the measurement value Ecn_a with the root key Krc stored in the storage unit 1013 to generate encrypted data Krc(Ecn_a). The HSM 1012 transmits the encrypted data Krc(Ecn_a) to the control unit 21. The control unit 21 transmits the encrypted data Krc(Ecn_a) to the server device 2000 through the interface unit 20. The server device 2000 receives the encrypted data Krc(Ecn_a) transmitted from the data security device (used) 1010 of the automobile 1001. The measurement value Ecn_a is an example of the secure boot result. That is, the data security device (used) 1010 transmits the secure boot result to the server device 2000.

(Step S204) The cryptographic processing unit 2016 of the server device 2000 decrypts the encrypted data Krc (Ecn_a) with the root key Krc stored in the storage unit 2012 to acquire the measurement value Ecn_a. Furthermore, the data security device (used) 1010 may transmit the measurement value Ecn_a to the server device 2000 as it is without encrypting the measurement value Ecn_a.

The expected value calculation unit 2013 calculates the CMAC with respect to the data security device code of the data security device (used) 1010, which is stored in the storage unit 2012, with the signature key Kbc stored in the storage unit 2012. The CMAC as the calculation result is referred to as an expected value Ecn_b. The verification unit 2014 compares the measurement value Ecn_a and the expected value Ecn b with each other to determine whether or not both the values match each other. From a result of the determination, in a case where both the values match each other, verification of the measurement value Ecn_a is "passing". In a case where verification of the measurement value Ecn_a is "passing", the processing proceeds to step S205. On the other hand, in a case where both the values do not match each other, verification of the measurement value Ecn_a is "failure". In a case where verification of the measurement value Ecn_a is "failure", the processing in FIG. 9 is terminated with respect to the data security device (used) 1010. Accordingly, in a case where verification of the measurement value Ecn_a is "failure", processing subsequent to step S205 is not executed with respect to the data security device (used) 1010. In addition, in a case where verification of the measurement value Ecn_a is "failure", the server device 2000 may execute predetermined error processing.

(Step S205) The server device 2000 transmits an in-vehicle key transmission request message to the data security device (used) 1010 of the automobile 1001. The in-vehicle key transmission request message is a message for making a request for transmission of a new in-vehicle key Kv_new to the data security device (used) 1010 in which the verification of the measurement value Ecn_a has been passed. The in-vehicle key transmission request message includes the root key Kr1 of the ECU(1) 1020. It is preferable that the server device 2000 encrypts the root key Kr1 with the root key Krc of the data security device (used) 1010 by the cryptographic processing unit 2016, and stores encrypted data Krc(Kr1) of the root key Kr1 in the in-vehicle key transmission request message. The data security device (used) 1010 of the automobile 1001 receives the in-vehicle key transmission request message from the server device 2000.

(Step S206) The control unit 21 of the data security device (used) 1010 allows the HSM 1012 to execute creation of the new in-vehicle key Kv_new. The key generation unit 34 of the HSM 1012 generates a new in-vehicle key Kv_new. For example, the key generation unit 34 of the HSM 1012 generates a random number, and generates the new in-vehicle key Kv_new on the basis of the random number. The HSM 1012 updates the in-vehicle key Kv_old_a stored in the storage unit 1013 with the new in-vehicle key Kv_new. According to this, the in-vehicle key Kv_old_a stored in the storage unit 1013 is rewritten with the new in-vehicle key Kv_new. Accordingly, an in-vehicle key that is stored in the storage unit 1013 after the updating is the new in-vehicle key Kv_new.

(Step S207) The control unit 21 of the data security device (used) 1010 transmits the root key Kr1 of the ECU(1) 1020, which is included in the in-vehicle key transmission request message, to the HSM 1012 to case the HSM 1012 to execute encryption of the new in-vehicle key Kv_new. Furthermore, in a case where the root key Kr1 of the ECU(1) 1020, which is included in the in-vehicle key transmission request message, is encrypted, the control unit 21 transmits encrypted data Krc(Kr1) of the root key Kr1 to the HSM 1012 to cause the HSM 1012 to decrypt the encrypted data Krc(Kr1) with the root key Krc, thereby acquiring the root key Kr1 of the ECU(1) 1020.

The cryptographic processing unit 32 of the HSM 1012 encrypts the new in-vehicle key Kv_new stored in the storage unit 1013 with the root key Kr1 of the ECU(1) 1020 to generate encrypted data Kr1(Kv_new). The HSM 1012 transmits the encrypted data Kr1(Kv_new) to the control unit 21. The control unit 21 transmits the encrypted data Kr1(Kv_new) to the ECU(1) 1020 through the interface unit 20. The ECU(1) 1020 receives the encrypted data Kr1 (Kv_new) from the data security device (used) 1010 through the interface unit 40.

(Step S208) The control unit 41 of the ECU(1) 1020 transmits the encrypted data Kr1(Kv_new) to the SHE 1022 to cause the SHE 1022 to execute decryption. The cryptographic processing unit 52 of the SHE 1022 decrypts the encrypted data Kr1 (Kv_new) with the root key Kr1 stored in the storage unit 1023 to acquire the new in-vehicle key Kv_new. The SHE 1022 updates the in-vehicle key Kv_old_b stored in the storage unit 1023 with the new in-vehicle key Kv_new. According to this, the in-vehicle key Kv_old_b stored in the storage unit 1023 is rewritten with the new in-vehicle key Kv_new. Accordingly, an in-vehicle key that is stored in the storage unit 1023 after the updating is the new in-vehicle key Kv_new. According to this, the ECU(1) 1020 stores the new in-vehicle key Kv_new that is common to the data security device (used) 1010.

The respective steps in FIG. 9 are executed with respect to all of the ECU(n) 1020 which are installed in the automobile 1001 in a similar manner. According to this, in the automobile 1001, the data security device (used) 1010 and the respective ECU(n) 1020 store a common new in-vehicle key Kv_new. In Example 3 of the reuse method, the root key Krc is an example of a third key. In addition, the root key Kr1 is an example of a fourth key. In addition, the new in-vehicle key Kv_new is an example of first data that is applied to the ECU(1) 1020.

According to Example 3 of the reuse method, the data security device (used) 1010 installed in the automobile 1001 can share a root key Krn (n is an integer of 1 to N) of each ECU(n) 1020 installed in the automobile 1001. According to this, in the automobile 1001, the data security device (used) 1010 can perform safe communication with each ECU(n) 1020 by using each root key Krn. This exhibits an effect that contributes to an improvement of reliability of the automobile 1001 on which the data security device (used) 1010 is installed.

In addition, according to Example 3 of the reuse method, in the automobile 1001, the data security device (used) 1010 and the ECU(n) 1020 can share the new in-vehicle key Kv_new. According to this, the ECU(n) 1020 can perform safe communication with another ECU(n) 1020 of the automobile 1001 or the data security device (used) 1010 by using the new in-vehicle key Kv_new.

<Modification Example c of Example 3 of Reuse Method>

Figure 10:
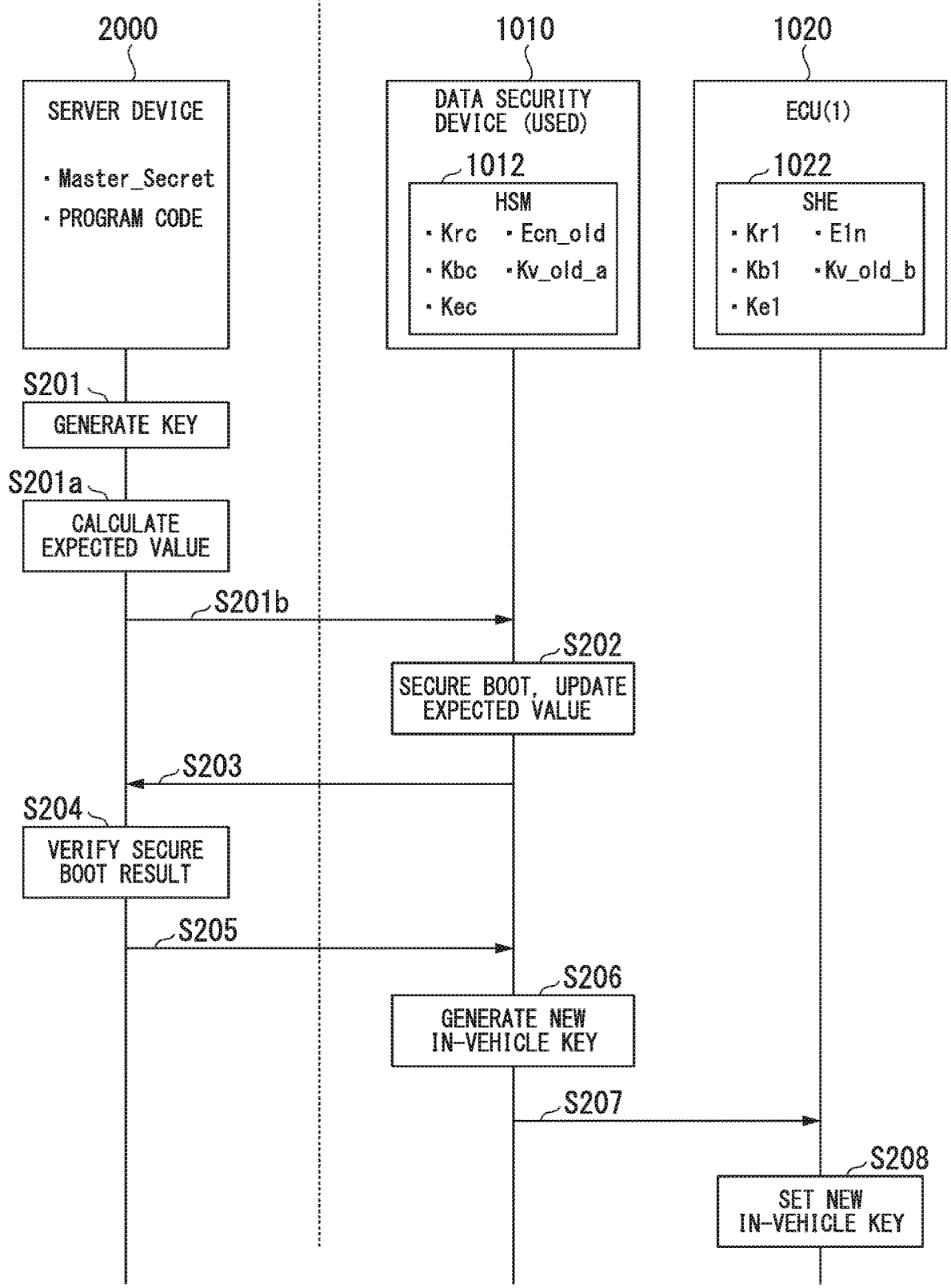
FIG. 10 is a sequence chart illustrating Modification Example c of Example 3 of the reuse method according to this embodiment.

FIG. 10 is a sequence chart illustrating Modification Example c of Example 3 of the reuse method. Modification Example c of Example 3 of the reuse method will be described with reference to FIG. 10. In FIG. 10, the same reference numeral will be given to portions corresponding to the respective steps in FIG. 9.

In Modification Example c of Example 3 of the reuse method, an expected value of measurement of the secure boot of the data security device (used) 1010 is supplied from the server device 2000 to the data security device (used) 1010.

In FIG. 10, step S201 is executed. Step S201 is the same as in Example 3 of the reuse method.

(Step S201a) After step S201, the expected value calculation unit 2013 of the server device 2000 calculates a CMAC, with respect to the data security device code of the data security device (used) 1010 which is stored in the storage unit 2012, with the signature key Kbc stored in the storage unit 2012. The CMAC as the calculation result is an expected value Ecn_b.

(Step S201b) The server device 2000 transmits the expected value Ecn_b to the data security device (used) 1010.

(Step S202) The data security device (used) 1010 updates the expected value Ecn_old stored in the storage unit 1013 with the expected value Ecn_b received from the server device 2000. According to this, the expected value Ecn_old stored in the storage unit 1013 is rewritten with the expected value Ecn_b. Accordingly, an expected value that is stored in the storage unit 1013 after the updating is the expected value Ecn_b. The data security device (used) 1010 compares the measurement value Ecn_a of the secure boot and the expected value Ecn_b stored in the storage unit 1013 to determine whether or not both the values match each other. From a result of the determination, in a case where both the values match each other, a secure boot result is "passing". On the other hand, in a case where both the values do not match each other, the secure boot result is "failure".

(Step S203) The data security device (used) 1010 transmits the secure boot result of "passing or failure" to the server device 2000.

(Step S204) The server device 2000 determines whether or not the data security device (used) 1010 passes in the secure boot with the secure boot result received from the data security device (used) 1010. In a case where the secure boot result received form the data security device (used) 1010 is "passing", the processing proceeds to step S205. On the other hand, in a case where the secure boot result received form the data security device (used) 1010 is "failure", the processing in FIG. 10 is terminated with respect to the data security device (used) 1010. Accordingly, in a case where the secure boot result is "failure", processing subsequent to step S205 is not executed with respect to the data security device (used) 1010. In addition, in a case where the secure boot result is "failure", the server device 2000 may execute predetermined error processing.

Next, steps S205, S206, S207, and S208 are executed. Steps S205, S206, S207, and S208 are the same as in Example 3 of the reuse method.

Furthermore, the server device 2000 may supply a verification value (for example, a random number) to the data security device (used) 1010 in advance. In addition, in step S203, in a case where the secure boot result is "passing", the data security device (used) 1010 allows the verification value to be included in the secure boot result of "passing", and does not allow the verification value to be included in the secure boot result of "failure" in a case where the secure boot result is "failure". The verification unit 2014 of the server device 2000 compares the verification value that is included in the secure boot result of "passing" of the data security device (used) 1010, and an original verification value that is supplied in advance to the data security device (used) 1010. From a result of the comparison, in a case where both the values match each other, the verification unit 2014 of the server device 2000 determines that the secure boot result of the data security device (used) 1010 is "passing". In a case where both the values do not match each other, the verification unit 2014 determines that the secure boot result of the data security device (used) 1010 is "failure".

In addition, the data security device (used) 1010 may encrypt the secure boot result by the cryptographic processing unit 32 of the HSM 1012, and may transmits the encrypted secure boot result to the server device 2000. An encryption key kec that is used in the encryption is shared between the server device 2000 and the data security device (used) 1010 in advance. The server device 2000 decrypts the encrypted data transmitted from the data security device (used) 1010 with the encryption key Kec stored in the storage unit 2012 by the cryptographic processing unit 2016 to acquire the secure boot result. Furthermore, the encryption key Kec may be a key that can be used in the HSM 1012 only in a case where the secure boot result is "passing". In this case, the cryptographic processing unit 32 of the HSM 1012 encrypts the secure boot result of "passing" with the encryption key Kec.

Hereinbefore, Modification Example c of Example 3 of the reuse method has been described.

The embodiment of the invention has been described in detail with reference to the accompanying drawings. However, a specific configuration is not limited to the embodiment, and includes design modification in a range not departing from the gist of the invention, and the like.

In description of the examples of the reuse method according to the embodiment, as an example of the ECU identifier, Configuration Example 4 of the ECU identifier, that is, the UID of the SHE provided in the ECU is used as the ECU identifier of the ECU, but there is no limitation thereto. For example, a value specific to another ECU other than the UID of the SHE may be used as the ECU identifier.

Alternatively, Configuration Examples 1, 2, and 3 of the ECU identifier may be used. In a case of using Configuration Examples 1, 2, and 3 of the ECU identifier, since the ECU identifier of the ECU includes the vehicle identification number (VIN) of the automobile on which the ECU is installed, when an automobile on which the ECU is installed is changed, the ECU identifier is changed to another value. According to this, the ECU identifier of a used ECU is generated by using the vehicle identification number (VIN) of an automobile that is a reuse destination of the used ECU. With respect to the used ECU that is installed in an automobile (second vehicle) that is the reuse destination, the server device 2000 generates various new keys (for example, a new root key, a new signature key, a new encryption key, and the like) by using a new ECU identifier that is generated by using the vehicle identification number (VIN) of the automobile that is the reuse destination. The key generation method is the same as in the above-described embodiment.

The server device 2000 supplies the new keys, for example, the new root key to the used ECU installed in the automobile that is the reuse destination to cause the used ECU to update the root key of the used ECU with the new root key. It is preferable that the server device 2000 encrypts the new root key with an old root key stored in the used ECU in advance, and transmits the encrypted new root key to the used ECU installed in the automobile that is the reuse destination. The used ECU decrypts the encrypted new root key with the old root key stored in the used ECU to acquire the new root key. The old root key of the used ECU is generated by the old ECU identifier that is generated by using the vehicle identification number (VIN) of an automobile (first vehicle) from which the used ECU is detached.

Furthermore, as in the ECU identifier, the device identifier of the data security device may be a value specific to the data security device. Alternatively, as in Configuration Examples 1, 2, and 3 of the ECU identifier, the device identifier may be a value for every automobile on which the data security device is installed. In a case where the device identifier of the data security device is a value for every automobile on which the data security device is installed as in Configuration Examples 1, 2, and 3 of the ECU identifier, as in the above-described ECU, in an automobile that is a reuse destination of the used data security device, various old keys of the used data security device are updated with new keys.

Furthermore, the maintenance tool 2100 may include the same function as in the server device 2000, and may function as the key generation device. In addition, the TCU 1050 or the infotainment device 1040 of the automobile 1001 may include the same function as in the server device 2000, and may function as the key generation device.

In the above-described embodiment, the HSM or the SHE is used in the data security device 1010 or the ECU 1020, but a cryptographic processing chips other than the HSM and the SHE may be used. With regard to the data security device 1010, for example, a cryptographic processing chip called "trusted platform module (TPM) f" may be used. The TPMf is tamper resistance. The TPMf is an example of a secure element. With regard to the ECU 1020, for example, a cryptographic processing chip called "TPMt" may be used. The TPMt is tamper resistance. The TPMt is an example of the secure element.

For example, in a maintenance facility or an automobile shop, and the like, when the ECU or the data security device of the automobile is replaced with a used article, the above-described embodiment may be applied to the used article installed in the automobile.

In the embodiment, the automobile is exemplified as a vehicle, but the embodiment is applicable to another vehicle such as a motor-equipped bicycle and a railway vehicle other than the automobile.

In addition, the computer program to realize the function of the respective devices may be recorded on a computer-readable recording medium, and the program recorded on the recording medium may be read out to a computer system to be executed by a processor and the like. Furthermore, the "computer system" stated here may be a computer system including hardware such as an OS and a peripheral device.

In addition, the "computer-readable recording medium" represents a recordable non-volatile memory such as a flexible disk, a magneto-optical disc, a ROM, and a flash memory, a portable medium such as a digital versatile disc (DVD), and a storage device such as a hard disk that is embedded in the computer system.

In addition, it is assumed that the "computer-readable recording medium" also includes a medium such as a volatile memory (for example, a dynamic random-access memory (DRAM)), which retains a program for a predetermined time, inside the computer system serving as a server or a client in a case where the program is transmitted through a network such as the Internet or a communication line such as a telephone line.

In addition, the program may be transmitted from a computer system in which the program is stored in a storage device and the like to other computer systems through a transmission medium, or transmission waves in the transmission medium. Here, the "transmission medium", through which the program is transmitted, represents a medium having a function of transmitting information similar to a network (communication network) such as the Internet and a communication line such as a telephone line.

In addition, the program may be a program configured to realize a part of the above-described functions.

In addition, the program may be a so-called differential file (differential program) capable of realizing the above-described functions in combination with a program that is recorded in advance in a computer system.

INDUSTRIAL APPLICABILITY

According to the invention, it is possible to attain an effect capable of improving the reliability of an automobile on which a used ECU is installed.

REFERENCE SIGNS LIST 20, 40: Interface unit
21, 41: Control unit
22, 42, 2012: Storage unit
23, 2014: Verification unit
32, 52, 2016: Cryptographic processing unit
33, 53: Measurement unit
34, 2015: Key generation unit
1001: Automobile
1002: In-vehicle computer system
1010: Data security device 1011, 1021: Main computing unit
1012: HSM
1013, 1023: Storage unit
1020: ECU
1022: SHE
1030: CAN
1040: Infotainment device
1050: TCU
1051: Communication module
1052: SIM
1060: Diagnostic port
2000: Server device
2011: Communication unit
2013: Expected value calculation unit
2100: Maintenance tool

The invention claimed is:

1. A reuse system, comprising:
a key generation device provided outside a vehicle and which executes processing related to a reuse of a used in-vehicle computer;
an in-vehicle computer that is detached from a first vehicle and is installed in a second vehicle; and
a data security device that is installed in the second vehicle,
wherein the key generation device includes:
a vehicle interface configured to transmit and receive data to and from the second vehicle,
a key generator that generates a root key and a signature key that are the same as a key stored in the in-vehicle computer from a time when the in-vehicle computer was installed in the first vehicle by using an in-vehicle computer identifier of the in-vehicle computer, and a master key that is common to the first vehicle and the second vehicle,
a data storage configured to store data already applied to the in-vehicle computer at a time when the in-vehicle computer, which is detached from the first vehicle and is installed in the second vehicle, is installed in the second vehicle, and
an expected value calculator that calculates an expected value of the measurement for the data stored in the data storage and already applied to the in-vehicle computer at the time when the in-vehicle computer is installed in the second vehicle by using the signature key generated by the key generator,
wherein the root key is transmitted to the second vehicle with the vehicle interface,
wherein the data security device includes:
a first interface that transmits and receives data to and from an external device of the data security device, and
a first cryptographic processor configured to encrypt an in-vehicle key, which is applied to the in-vehicle computer, with the root key received from the key generation device through the first interface to generate an encrypted in-vehicle key,
wherein the encrypted in-vehicle key is transmitted to the in-vehicle computer through the first interface,
wherein the in-vehicle computer includes:
a second interface that transmits and receives data to and from an external device of the in-vehicle computer,
a second storage that stores the root key and the signature key from a time when the in-vehicle computer was installed in the first vehicle, and
a second cryptographic processor that decrypts the encrypted in-vehicle key, which is received from the data security device through the second interface, with the root key that is stored in the second storage, and
a measurement processor that performs measurement of data that is applied to the in-vehicle computer by using the signature key that is stored in the second storage,
wherein a measurement result by the measurement processor is transmitted to the key generation device or the data security device through the second interface, and
the measurement result, which is transmitted from the in-vehicle computer, is verified with the expected value in the key generation device or the data security device.

2. A reuse method of an in-vehicle computer that is detached from a first vehicle and is installed in a second vehicle, the reuse method comprising:
generating, by a server device that is provided outside a vehicle and executes processing related to a reuse of a used in-vehicle computer, a root key that is the same as a key stored in the in-vehicle computer from a time when the in-vehicle computer was installed in the first vehicle by using an in-vehicle computer identifier of the in-vehicle computer and a master key that is common to the first vehicle and the second vehicle;
transmitting, by the server device, the root key to the second vehicle through a vehicle interface that transmits and receives data to and from the second vehicle;
encrypting, by a data security device, an in-vehicle key, which is applied to the in-vehicle computer, with the root key received from the server device through a first interface that transmits and receives data to and from an external device of the data security device to generate an encrypted in-vehicle key;
transmitting, by the data security device, the encrypted in-vehicle key to the in-vehicle computer through the first interface;
decrypting, by the in-vehicle computer, the encrypted in-vehicle key, which is received from the data security device through a second interface that transmits and receives data to and from an external device of the in-vehicle computer, with the root key stored in a second storage unit of the in-vehicle computer from a time when the in-vehicle computer was installed in the first vehicle;
performing, by the in-vehicle computer, measurement of data that is applied to the in- vehicle computer by using a signature key that is stored in the in-vehicle computer;
generating, by the server device, the signature key that is the same as a key stored in the in-vehicle computer from the time when the in-vehicle computer was installed in the first vehicle by using the in-vehicle computer identifier and the master key;
calculating, by the server device, an expected value of the measurement by using the generated signature key; and
verifying a measurement result which is received from the in-vehicle computer, with the expected value,
wherein the server device includes a data storage configured to store data already applied to the in-vehicle computer at a time when the in-vehicle computer is installed in the second vehicle, and
wherein in the calculating of the expected value, the expected value of the measurement for the data is calculated, the data being stored in the data storage and already applied to the in-vehicle computer at the time when the in-vehicle computer, which is detached from the first vehicle and is installed in the second vehicle, is installed in the second vehicle.

3. A non-transitory computer-readable recording medium storing a computer program that causes a computer of a key generation device, which is provided outside a vehicle and executes processing related to a reuse of a used in-vehicle computer and includes a vehicle interface that transmits and receives data to and from a second vehicle on which an in-vehicle computer detached from a first vehicle is installed, to realize processing of:

generating a root key that is the same as a key stored in the in-vehicle computer from a time when the in-vehicle computer was installed in the first vehicle by using an in-vehicle computer identifier of the in-vehicle computer, and a master key that is common to the first vehicle and the second vehicle;

transmitting the root key to the second vehicle through the vehicle interface;

generating a signature key that is the same as a key stored in the in-vehicle computer from the time when the in-vehicle computer was installed in the first vehicle by using the in-vehicle computer identifier and the master key; and calculating an expected value of the measurement for data applied to the in-vehicle computer by using the signature key that is generated, wherein the server device includes a data storage configured to store the data already applied to the in-vehicle computer at a time when the in-vehicle computer is installed in the second vehicle, wherein in the calculating of the expected value, the expected value of the measurement for the data is calculated, the data being stored in the data storage and already applied to the in-vehicle computer at the time when the in-vehicle computer, which is detached from the first vehicle and is installed in the second vehicle, is installed in the second vehicle, and wherein the measurement result, which is transmitted from the in-vehicle computer, is verified with the expected value.

* * * * *

UNITED STATES PATENT AND TRADEMARK OFFICE
CERTIFICATE OF CORRECTION

| | | |
|---|---|---|
| PATENT NO. | : 11,082,228 B2 | Page 1 of 1 |
| APPLICATION NO. | : 16/315891 | |
| DATED | : August 3, 2021 | |
| INVENTOR(S) | : K. Takemori et al. | |

It is certified that error appears in the above-identified patent and that said Letters Patent is hereby corrected as shown below:

In the Claims

Column 28, Line 42 Claim 2, change "storage unit of" to -- storage of --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*